United States Patent
Lee et al.

(10) Patent No.: US 12,465,469 B2
(45) Date of Patent: Nov. 11, 2025

(54) METHOD, SYSTEM AND DEVICES FOR INSTANT AUTOMATED DESIGN OF A CUSTOMIZED DENTAL OBJECT

(71) Applicant: DENTSPLY SIRONA Inc., York, PA (US)

(72) Inventors: Jinho Lee, Belmont, MA (US); Chih-Yung Jesse Huang, Westford, MA (US); Eric Bright, Fiskdale, MA (US)

(73) Assignee: Dentsply Sirona Inc., York, PA (US)

( * ) Notice: Subject to any disclaimer, the term of this patent is extended or adjusted under 35 U.S.C. 154(b) by 647 days.

(21) Appl. No.: 17/637,107

(22) PCT Filed: Sep. 3, 2020

(86) PCT No.: PCT/US2020/049093
§ 371 (c)(1),
(2) Date: Feb. 22, 2022

(87) PCT Pub. No.: WO2021/046147
PCT Pub. Date: Mar. 11, 2021

(65) Prior Publication Data
US 2022/0296344 A1 Sep. 22, 2022

Related U.S. Application Data

(60) Provisional application No. 62/896,043, filed on Sep. 5, 2019.

(51) Int. Cl.
*A61C 13/00* (2006.01)
*A61C 5/77* (2017.01)
(Continued)

(52) U.S. Cl.
CPC .......... *A61C 13/0004* (2013.01); *A61C 5/77* (2017.02); *G06N 3/02* (2013.01); *G16H 30/40* (2018.01)

(58) Field of Classification Search
CPC ...... A61C 13/0004; A61C 5/77; G16H 30/40; G06N 3/02
See application file for complete search history.

(56) References Cited

U.S. PATENT DOCUMENTS

| 6,523,019 B1 | 2/2003 | Borthwick |
| 7,362,890 B2 | 4/2008 | Scharlack |

(Continued)

FOREIGN PATENT DOCUMENTS

| CN | 102016854 A | 4/2011 |
| CN | 102438545 A | 5/2012 |

(Continued)

OTHER PUBLICATIONS

International Search Report; PCT/US2020/049093; Oct. 14, 2020(completed); Oct. 26, 2020 (mailed).

(Continued)

*Primary Examiner* — Nicholas D Lucchesi
(74) *Attorney, Agent, or Firm* — SCHWEGMAN LUNDBERG & WOESSNER, P.A.

(57) ABSTRACT

Embodiments of the present invention provide a method, system, devices and software which provide customized, clinically relevant designs, e.g. treatment plans/solutions for at least single tooth replacement therapy in real-time as needed to enable immediate confirmation of the validity and execution of patient-specific treatment solutions.
A Machine Learning algorithm is used in a method or system for computer implementation of automatic restoration design. The restoration design includes the design of restorative elements such as crowns and abutments. Software is provided for carrying out the methods when executed on a digital processor. Manufacturing of the restorative elements is also included.

13 Claims, 10 Drawing Sheets

(51) Int. Cl.
*G06N 3/02* (2006.01)
*G16H 30/40* (2018.01)

(56) References Cited

U.S. PATENT DOCUMENTS

| | | | |
|---|---|---|---|
| 7,551,760 | B2 | 6/2009 | Scharlack |
| 9,504,541 | B2 | 11/2016 | Scharlack |
| 9,814,549 | B2 | 11/2017 | Lee |
| 2004/0067465 | A1 | 4/2004 | Schomann |
| 2006/0072810 | A1 | 4/2006 | Scharlack |
| 2007/0154868 | A1 | 7/2007 | Scharlack |
| 2008/0002869 | A1 | 1/2008 | Scharlack |
| 2009/0319068 | A1 | 12/2009 | Sager |
| 2012/0070803 | A1 | 3/2012 | Manai et al. |
| 2012/0205828 | A1 | 8/2012 | Laubersheimer et al. |
| 2015/0056576 | A1 | 2/2015 | Nikolskiy |
| 2016/0224690 | A1 | 8/2016 | Lee |
| 2016/0374784 | A1 | 12/2016 | Joshi |
| 2017/0095319 | A1 | 4/2017 | Scharlack |
| 2018/0028294 | A1* | 2/2018 | Azernikov ........ G06F 18/24143 |
| 2018/0110590 | A1 | 4/2018 | Maraj |
| 2018/0121601 | A1* | 5/2018 | Hahm .................... G16B 30/10 |
| 2018/0174367 | A1* | 6/2018 | Marom .................. A61C 9/008 |
| 2018/0184795 | A1* | 7/2018 | Pai ..................... A46B 15/0038 |
| 2019/0046297 | A1* | 2/2019 | Kopelman ........... A61C 19/003 |
| 2020/0179082 | A1* | 6/2020 | Schneider .......... A61C 13/0003 |
| 2021/0090694 | A1* | 3/2021 | Colley .................. G16H 15/00 |

FOREIGN PATENT DOCUMENTS

| | | |
|---|---|---|
| CN | 107742530 A | 2/2018 |
| CN | 108711454 A | 10/2018 |
| CN | 109310488 A | 2/2019 |
| CN | 114342002 A | 4/2022 |
| EP | 4025156 | 7/2022 |
| JP | 2010220882 | 10/2010 |
| WO | 2007081557 A1 | 7/2007 |
| WO | WO-2021046147 A1 | 3/2021 |

OTHER PUBLICATIONS

Written Opinion of the International Searching Authority; PCT/US2020/049093; Oct. 14, 2020(completed); Oct. 26, 2020 (mailed).
International Preliminary Report on Patentability; PCT/US2020/049093; Oct. 14, 2020(completed); Oct. 26, 2020 (mailed).
Zhu, Fu-Dong, et al., "Digital 3D anatomical modeling of the mandible with full teeth", Acta Anatomica Sinica, vol. 45, No. 4, (Aug. 2014), 4 pgs.
"Chinese Application Serial No. 202080062813.7, Office Action mailed Aug. 28, 2024", w/English Translation, 13 pgs.
"Japanese Application Serial No. 2022-514478, Final Notification of Reasons for Refusal mailed Oct. 29, 2024", w English translation, 6 pgs.
"Russian Application Serial No. 2022107465, Office Action mailed Aug. 1, 2024", W English Translation, 27 pgs.
"Australian Application Serial No. 2020341455, First Examination Report mailed Nov. 13, 2024", 4 pgs.
"European Application Serial No. 20772506.0, Response to Communication pursuant to Rules 161(1) and 162 EPC filed Oct. 11, 2022", 9 pgs.
"European Application Serial No. 20772506.0, Communication Pursuant to Article 94(3) EPC mailed Aug. 23, 2023", 8 pgs.
"European Application Serial No. 20772506.0, Response filed Jan. 24, 2024 to Communication Pursuant to Article 94(3) EPC mailed Aug. 23, 2023", 8 pgs.
"European Application Serial No. 20772506.0, Summons to attend oral proceedings mailed Aug. 2, 2024", 9 pgs.
"European Application Serial No. 20772506.0, Response filed Feb. 26, 2025 to Summons to attend oral proceedings mailed Aug. 2, 2024", 14 pgs.
"Australian Application Serial No. 2020341455, First Examination Report mailed Feb. 12, 2025", 3 pgs.
"Chinese Application Serial No. 202080062813.7, Office Action mailed Feb. 20, 2025", w English Translation, 16 pgs.
"Japanese Application Serial No. 2022-514478, Response filed Jan. 29, 2025 to Final Notification of Reasons for Refusal mailed Oct. 29, 2024", W English Claims, 7 pgs.
"Chinese Application Serial No. 202080062813.7, Response filed Apr. 21, 2025 to Office Action mailed Feb. 20, 2025", W English Claims, 14 pgs.
"Australian Application Serial No. 2020341455, Response filed May 2, 2025 to First Examination Report mailed Feb. 12, 2025", 45 pgs.
"Brazil Application Serial No. BR112022002448-7, Office Action mailed May 13, 2025", w Machine English translation, 9 pgs.
"Korean Application Serial No. 10-2022-7011191, Notice of Preliminary Rejection mailed May 29, 2025", W English Translation, 14 pgs.
"Chinese Application Serial No. 202080062813.7, Response Filed Jun. 16, 25 to Consultation by Telephone In Person- Response Needed mailed Jun. 6, 2025", W English Claims, 11 pgs.
Emelyanov, AA, "Simulation modeling of economic processes, Moscow", Finance and Statistics, (2002), 52 pgs.
Khvatkov, E. V., "The use of multidimensional databases for the analysis of specialized meteorological information", Bachelor's thesis, St. Petersburg State University Faculty of Applied Mathematics—Control Processes Department of Computer Modeling and Multiprocessor Systems, St. Petersburg; With Machine Translation, (2017), 37 pgs.
"European Application Serial No. 20772506.0, Response Filed Jul. 23, 2025 to Communication under Rule 71(3) mailed Apr. 3, 2025", 8 pgs.

\* cited by examiner

| Accuracy (difference in deg.) | Convolutional Neural Network | Initialization (Multi-Dim. Non-Lin. Opt.) | Design Range Study (300 samples) |
|---|---|---|---|
| 0 | 13.18% (102) | 13.37% | |
| <= 5 | 92.44% (717) | 66.49% | ~93% |
| <= 10 | 99.4% (771) | 90.28% | ~99.7% |
| <= 15 | 99.9% (775) | 94.97% | 100% |
| <= 20 | 100% (776) | 95.83% | 100% |

Fig. 11

| Selected parameters | 0.5 mm accuracy | 1.0 mm accuracy |
|---|---|---|
| Cusp Height Facial | 83.7% | 96.8% |
| Cusp Location Facial | 98.8% | 99.8% |
| Shoulder Width Facial | 98.8% | 100% |
| Margin Height Facial | 94.8% | 99.3% |
| Margin Width M/D | 81.7% | 96.7% |
| EPS Height Facial | 93.8% | 98.1% |

METHOD, SYSTEM AND DEVICES FOR INSTANT AUTOMATED DESIGN OF A CUSTOMIZED DENTAL OBJECT

The present invention relates to computer-implemented methods or systems for automatic restoration design. The present invention can make use of Machine Learning algorithms for computer-implemented methods or systems of automatic restoration design. The restoration design includes the design of restorative dental objects such as abutments or crowns for implants or crowns for a tooth stub. Software is provided for carrying out the methods when executed on a digital processor. Manufacturing of the restorative dental objects is also included within the scope of the present invention.

BACKGROUND

Design proposals for restorative and surgical planning for implant-based single tooth replacement therapy are typically generated using desktop-based dental CAD/CAM software in the dental lab or dentist office. The planning is typically generated manually using this software by a dental technician and/or a clinician. In some instances, the dental technician and/or clinician collaborate on the planning to achieve a clinically relevant design that meets the treatment solution expectations of the clinician and the patient. This process of generating, reviewing, and accepting the planning for a customized single tooth replacement takes several hours as a minimum to several days or more of elapsed clock time.

Alternatively, an analog impression (cast model from an impression of the patient's mouth that has been scanned by the lab or centralized manufacturer) or digital impression (intra-oral scan) is taken and the scan data is transferred as part of placing an order to a centralized design and manufacturing center. Design proposals are initialized by traditional methods and are typically reviewed and adjusted as necessary by Abutment Design Technicians (ADT's). The design proposals can then be shared with the party who placed the order using a variety of two and three-dimensional viewing and editing desktop or web-based software applications. Customers can have the opportunity to review and make changes to the design proposal before approving the plan. As in the case with desktop-based CAD/CAM software, the elapsed clock time from receipt of the model or scan data to receipt of a design proposal ranges from several hours to several days. In addition, current workflows with centralized manufacturing organizations require treatment solution providers to use a variety of different software and systems in order to obtain their patient-specific design proposal. Some of these electronic environments are not fully integrated or connected, which makes use of the complete workflow a challenge from a usability standpoint.

With either scenario listed above, tooth replacement treatment solution providers at present always encounter a significant delay between the input data they collect (i.e., the scan of the model or digital impression) and the output they need (i.e., the patient-specific treatment solution proposal).

The delay between input and output is a major source of frustration and value loss with treatment solution providers. In some instances, it is determined hours or days after the patient has left the office that an additional analog or digital impression is needed. This "rework" requires an additional patient visit for which the treatment solution provider cannot charge.

The treatment solution provider at present has to specify the details of a treatment solution prior to generating or receiving a patient-specific design proposal back from either their in-house system or their centralized manufacturer. As such, alternative treatment solutions are only provided in a serial or iterative manner. In some instances, current workflows take hours or even days to arrive at patient-specific treatment solutions which meet all clinical, cost, and other requirements.

The patient seeking the tooth replacement is typically under at least some discomfort or inconvenience during this delay period.

Current "tooth in a day" systems do not provide premium highly esthetic patient-specific tooth replacement solutions.

Even with the advance of digital dentistry, it remains a very challenging problem to create customized dental restoration objects (e.g. dental abutments and crowns) that would fit to a specific patient's teeth in a fully automatic manner. Most of the dental design software provides users with a starting point of the design of the dental object of interest and a set of tools that would allow modification or adjustment of the provided initial design. To minimize the user efforts for this manual adjustment, it is important to be able to provide an initial design that would fit to the given patient's dentition environment as optimally as possible. This may require some dental clinical knowledge). Designing and implementing computerized algorithms to create such a dental object automatically would be a very complicated and challenging process, yet its effectiveness would vary depending on the amount of effort put into the development process.

A traditional approach for design automation is to rely on the intermediate detection of dental features on the 3D scan data (DFD: Dental Feature Detection). Usually each software component or module relies on the output of its previous component and its output quality depends on its input quality, and the errors on each component can be propagated or accumulated easily throughout the entire process. Additionally, each component's functionality is designed by explicit programming of the specific algorithms based on the heuristics or known rules and constraints, which would cause complexity and difficulty in creating such a software module. There is no guarantee that the desired output is obtained for, on some specific marginal cases, might not have been included in the algorithm.

Another disadvantage of this chain of software components or modules would be a lengthy execution time due to its nature of heavy computation of complex algorithms. The entire automation pipeline will typically take 5-10 minutes to get the final restoration design starting from the raw inputs, for example.

REFERENCES

"Probabilistic record linkage model derived from training data" as described in U.S. Pat. No. 6,523,019B1, Choicemaker Technologies Inc.

"Computer-implemented dental restoration design" as described in US2015056576A), Glidewell Dental Ceramics.

"Dental CAD Automation Using Deep Learning" as described in US2018/0028294 A1 "Method for creating flexible arch model of teeth for use in restorative dentistry" as described in U.S. Pat. No. 9,814,549B2.

Also US 2017/0095319, U.S. Pat. No. 9,504,541, US 2007/0154868, U.S. Pat. Nos. 7,551,760, 7,362,890, US 2008/0002869 and US 2006/0072810 are all included by reference.

"System and Method for Adding Surface Detail to Digital Crown Models Created Using Statistical Techniques" as described in US20160224690A1.

Ronald S. Scharlack, Alexander Yarmarkovich, Bethany Grant, Method and system for designing custom restorations for dental implants, International Patent, Publication of WO2007081557A1.

Charles R. Qi, Hao Su, Kaichun Mo, Leonidas J. Guibas, PointNet: Deep Learning on Point Sets for 3D Classification and Segmentation, CVPR 2017.

SUMMARY OF THE INVENTION

An object of the present invention is to provide an automated computer-based design of customized dental prosthetics. Preferably embodiments of the present invention represent an improvement over conventional methods.

Embodiments of the present invention can make use of computer-implemented methods or systems of automatic restoration design. Embodiments of the present invention, for example preferably make use of Machine Learning algorithms for the computer-implemented methods or systems of automatic restoration design. The restoration design can include the design of restorative objects such as abutments for implants or crowns for implants or teeth stubs.

The computer-based methods or systems for automated design of custom abutments and crowns can be for single tooth restoration on implants or crowns for stub of a single tooth. Software is provided for carrying out the methods when executed on a digital processor. Manufacturing of the corresponding customized restorative objects (customized abutments and crowns) is also included.

Embodiments of the present invention are preferably based on solving the problem of dental design restoration by connecting end-to-end input and output in the problem domain through an Artificial Neural Network (ANN), and training the system with known data sets to find the direct patterns between the input and output without relying on any intermediate form of data, i.e. by operating in an end-to-end manner.

Such methods can make use of specific examples of underlying parameter-based restoration models. Embodiments of the present invention can be applied to any specific parametric restoration models.

In one aspect embodiments of the present invention relate to a computer-based method for automated design of custom abutments and crowns for single tooth restorations on implants or crowns on single tooth stubs, the method comprising the steps:
1) Obtaining, e.g. by scanning or retrieving from an archive, 3D images of the mouth of a patient, and
2) Applying computer based end-to-end Machine Learning models.

The output can be an automated output such as a representation of a shape such as a set of parameters which defines an abutment or crown. These parameters are part of a parametric modelling. Software is provided for carrying out the methods when executed on a digital processor using parametric modeling techniques. The output of the representation of a shape of an abutment or crown can be obtained within five minutes of receipt of scan data of the patient, alternatively within one minute of receiving scan data, and more preferably in less than 30 seconds of receiving scan data of a patient. The output may be provided via an I/O port or an interface for example.

Manufacturing of the corresponding customized restorative dental objects (custom abutments and crowns) is also included.

Preferred embodiments of the present application include ML-based (machine learning based) automatic design of custom abutments and crowns for a single tooth restoration on implants or for crowns on a single tooth stub. The following are not necessarily part of and are preferably not part of embodiments of the present invention:
Automated surgical planning
Scan data registration (CBCT and surface scan data) and tooth segmentation
Dental feature detection
Surgical guide design Aspects of the present invention include:
The computer-based design of the custom abutment or crown for an implant or a crown for a single tooth stub based on scanned data or measurements taken of the patient's anatomy including implant location in the jaw, soft tissue, and tooth anatomy all relative to each other. Embodiments of the present invention can include scanning of a model of the patient's mouth after implant surgery using a fiduciary device called a FLO (Feature Location Object) to obtain the measurements required.
The computer-based design of the custom abutment or crown can be fully parametric and the geometry can be uniquely defined by the values of a plurality of parameters such as tens of parameters, twenties of parameters, fifties or sixties of parameters.
Embodiments of the present invention create and output a set of parameters for the underlying target model. The output may be provided via an I/O port or an interface for example.

Embodiments of the present invention can be integrated into a computer-based technology platform. The use of Artificial Intelligence and Machine Learning in embodiments of the present invention has proved to be very effective for solving certain problems that were very difficult to solve with traditional methods. Embodiments of the present invention can relate to formulation of the problem of automatic implant-based restoration design and/or determination of treatment plans, and to solving this problem. Restorative dental objects include an abutment and a crown. Embodiments of the present invention can make use of a computer-implemented Artificial Neural Network (ANN). Embodiments of the present invention can include training the ANN effectively and predicting a desired set of design parameters from input data whereby the outputs comprise parameter values or representations from which the parameter values and the 3D shape of the dental object in question can be derived. These parameter values or representations thereof can be output with a high accuracy. These parameter values or representations thereof can be output in a very fast manner (e.g. in less than five minutes after receipt of a data scan, in less than one minute or down to 30 seconds) and can result in a quality comparable to the ones created by expert human designers. Embodiments of the present invention include training the ANN in an end-to-end manner. They can also include running the trained computer based ANN in an operative mode including inputting 3D images of the mouth of a patient (e.g. via an I/O port or an interface), processing these in the computer based ANN, and outputting parameter values or representations (e.g. via an I/O port or an interface), from which the parameter values and the 3D shape of the dental object in question can be derived in an end-to-end manner.

Embodiments of the present invention include methods of creating a computer-implemented ANN based on a 3D Convolutional Neural Network (CNN). Embodiments of the present invention include effective method to convert a regression problem into a classification problem. Embodiments of the present invention can also include specific methods of how to generate input data in a good or an optimal way to reflect the different coordinate systems that each design parameter is represented in. In addition, a hierarchical structure can be provided for training the neural network whereby individual parameters, or groups of parameters may be used for training. Parameters with a greater influence on the final design can be used for training or prediction of less important parameters. Thus, the hierarchical structure refers to the ranking of the importance of one or more parameters (which are used for defining the overall shape of a structure such as a restorative dental object) with respect to other parameters of the same parametric model. Independent of the level within the hierarchical all of the parameters relate to the entire abutment, the entire crown, etc.

Further, in addition or alternatively a hierarchical predictive structure can be provided to predict a single parameter value or a set of multiple parameters, e.g. taking into account the dependencies between them. Dental feature detection (DFD) or 2D contour imaging of a crown (i.e. not a full 3D restoration) are optional intermediate input or output in accordance with the present invention but they are not only less preferred compared with inputting a direct 3D image (e.g. a point cloud) of a patient's jaw but they are also unnecessary. Hence outputs according to embodiments of the present invention do not need to rely on any intermediate results such as DFD results or 2D contour imaging.

Embodiments of the present invention provide a "model-based" predictive system and method. The outputs of the system or method are model parameters or representations of model parameters of the 3D shape of the dental object, e.g. parameter values which can be numbers defining the restorative dental objects such as abutments and crowns which are required for the patient. Once predicted by the computer-based ML system or method according to embodiments of the present invention, these parameters can be used to uniquely define the full 3D shape, position, and orientation of the restorative dental objects such as abutments and crowns. To calculate this shape the parameter values can be fed into an underlying 3D parametric model.

Embodiments of the present invention can make use of a "probability vector" that is associated with a partition of a range of values a model parameter can represent, e.g. partitioning the range of a model parameter into a number of bins each having a smaller range. This converts a regression problem into a classification problem, each bin being a class. Embodiments of the present invention do not require prior "segmenting" of input data, e.g. segmenting of volumetric image data or segmenting the 3D surface into different regions.

Embodiments of the present invention include a system and a method for providing a computer-based workflow that revolutionizes the way dental treatment service providers interact with centralized model organizations. Embodiments of the present invention can provide software which when executed on a processing engine such as a microprocessor carry out any of the methods of the present invention. Embodiments of the present invention can include any or all of:

1) A method which includes or takes as an input, optical scans of a surface of teeth or jaw of a patient's mouth to gain 3D surface data and to share this data including, preferably automatic detection of one or more implant locations. Existing scans of the teeth or jaw can be used. The scanned images are preferably 3D images not 2D images, such as in a point cloud or a triangle mesh. The 3D scanning can be by an optical scanning device. The scanning can be by a medical image acquisition method such as X-ray, MRI, CT scan but this is less preferred.

2) ML-based automated design of restorative dental objects such as abutments and crowns based on the outcomes of existing historical cases that have been completed successfully, e.g. by training using a machine learning method and system with the raw data such as data of 3D input images and the outcomes of existing historical cases in an end-to-end manner; and 3) A method of presenting designs to patients or customers e.g. in the form of 2D or 3D graphics preferably via an easy to use graphics editor such that the patient or customer can observe or is in control of the details of a treatment they will undergo. These methods can complete within seconds, which opens up the possibility to share treatment solutions with patients while they are potentially "still in the dentist's chair". The output of a representation of a shape of an abutment or crown which can be used to present the shape to the patient can be obtained within five minutes of receipt of scan data of the patient, alternatively within one minute of receiving scan data, and more preferably in less than 30 seconds of receiving scan data of a patient.

Workflow methods which are embodiments of the present invention can take place before any work order is placed. There is essentially a zero elapsed clock time delay between input (e.g. the raw scan data which is preferably 3D scan data in the form of a point cloud) and the output, i.e. the patient-specific restoration design.

Digital workflows according to embodiments of the present invention comprise a series of connected preferably cloud-based software services that are completely detached from the existing ordering tunnel and downstream "backoffice" software elements.

An embodiment of the present invention can comprise one some or all of the following elements and functionalities:

1) Scan data (e.g. in the form of 3D scan data which can be a point cloud) and upload, either measured or recovered from storage, comprising 3D images of the mouth of a patient.

2) Automated FLO detection and scan quality checks whereby some ancillary products require a certain minimum scan quality.

3) Design parameter estimation based on a computer-implemented ML algorithm. The ML algorithm is trained on existing cases completed by human experts. The ML algorithm can be adapted to capture the changes to designs that the user is making. These changes can be incorporated into the training such that the ML algorithm evolves to a "dynamic" and customer-specific model.

4) A design proposal which can be shared with the user such as a patient. This can be done by presenting graphics to the patient e.g. using a web-based enhanced UX viewer/editor.
5) Optionally, a software application using augmented reality to assist the clinician in presenting the treatment plan proposal to the patient.
6) A streamlined (e.g. single click) ordering button or icon is preferably built directly into the viewer/editor user interface.
7) Optionally, a suite of connected software in a "back-office" which takes the customer approved patient-specific designs as input to a centralized manufacturing process. The design is usable by the centralized manufacturing organization.
8) Outputs from the centralized manufacturing process can include a variety of customized restorative products, both digital and manufactured, that are actually produced, sent, (optionally invoiced of a sale based on a fee to the customer). These products include core, abutment or crown digital files in an STL or otherwise appropriate format that are posted to the customer's web-based account page for use in download and manufacturing a final restoration e.g. by subtractive machining such as milling or layered manufacturing such 3D printing in metal or other manufacturing method used by the customer lab or chairside. In addition, manufactured customized dental objects are also output options including abutments, crowns, and ancillary customized products. Such a workflow enables "next day" permanent premium highly esthetic patient-specific tooth replacement solutions as well as "same day" patient specific solutions where TiBase stock solutions and customized mesostructures (or full restorations) are deemed sufficient clinical solutions.

In summary, embodiments of the present invention provide a method, system, devices and software for solving the aforementioned problems by providing customized, clinically relevant designs, e.g. treatment plans/solutions for at least single tooth replacement therapy in real-time as needed to enable immediate confirmation of the validity and execution of patient-specific treatment solutions. The treatment solution provider does not necessarily experience rework or delay in knowing which treatment solution meets all requirements. For the patient, discomfort and inconvenience are minimized while at the same time a permanent esthetic solution can be provided. Embodiments of the present invention can concatenate computational algorithms and software services into an overall high value new digital workflow. The combination of these elements which achieve an improved result is not entirely obvious to experts in this field. The development and demonstration of the successful approach required trial and error and controlled experimentation in which certain results were not known or anticipated in advance.

Advantages of embodiments of the present invention are any, some or all of:
Instant or rapid design. The output of the representation of a shape of an abutment or crown can be obtained within five minutes of receipt of scan data of the patient, alternatively within one minute of receiving scan data, and more preferably in less than 30 seconds of receiving scan data of a patient.
No need to write explicit, hand-crafted, complex algorithms to determine the shape of a dental object in function of the patient specific environment as with conventional design automation approaches.
No black-box approach to the design of the dental objects: ability to exercise control over the shape parameters i.e. to define the shape parameter such that they have clinical meaning. (e.g. width of the abutment margin, height of the abutment core, etc.). This implies that certain features of the design can still be easily modified after the automated design, if so desired.

Embodiments of the Present Invention can be Described as:

Clause 1. A computer-implemented method for training a machine learning system, the machine leaning system being installed on one or more computing devices, the method comprising training the machine learning system with a plurality of preexisting treatment 3D data sets, the 3D data sets comprising 3D images of patients' dentitions as inputs on one end of the machine learning system and 3D shapes of representations of patients' restorative dental objects on the other end as outputs.

The training of the machine learning system using a plurality of preexisting treatment 3D data sets can be performed in an end-to-end manner.

Clause 2. A computer-implemented method for providing a representation of a 3D shape of a restorative dental object for a patient, the method comprising inputting a representation of a 3D scan of at least one portion of a patient's dentition to a trained machine learning system (e.g. via an I/O device or an interface), the representation of a 3D scan defining at least one implant position, the machine learning system being installed on one or more computing devices, and identifying, using the trained machine learning system, a representation of a 3D shape of the restorative dental object for the implant, wherein the output of the representation can be obtained within five minutes of receipt of scan data of the patient, alternatively within one minute of receiving scan data, and more preferably in less than 30 seconds of receiving scan data of a patient.

The identifying can be performed in an end to end manner.

Clause 3. A computer-implemented method for providing a representation of a 3D shape of a restorative dental object for a patient, the method comprising:

training, by one or more computing devices and using a plurality of preexisting treatment 3D data sets, a machine learning system, receiving, by the one or more computing devices, a patient's 3D scan data representing at least one portion of a patient's dentition which defines at least one implant position, and identifying, using the trained machine learning device, a representation of a 3D shape of the restorative dental object for the implant. The identifying of the representation can be performed within five minutes of receipt of scan data of the patient, alternatively within one minute of receiving scan data, and more preferably in less than 30 seconds of receiving scan data of a patient The training of the machine learning system using a plurality of preexisting treatment 3D data sets can be carried out in an end-to-end manner.

Clause 4. A computer-implemented method according to clause 3, wherein the identifying is done in an end-to-end manner.

Clause 5. A computer-implemented method according to any of the clauses 1 to 4, comprising applying computer based end-to-end Machine Learning models.

Clause 6. A computer-implemented method according to any of the clause 1 to 4, wherein the machine learning system is a neural network.

Clause 7. A computer-implemented method of clause wherein the neural network is comprised of a CNN.

Clause 8. A computer-implemented method according to any of clauses 2 to 5, wherein receiving comprises receiving scanned 3D images of the mouth of a patient or 3D images of the mouth of a patient retrieved from an archive.

Clause 9. A computer-implemented method of any of clauses 2 to 8, wherein the identifying step includes generating a 3D shape of the restorative dental object. The restorative dental object can be for direct for attachment to the implant or via one or more intermediaries.

Clause 10. A computer-implemented method of clause 9, wherein the 3D shape is not a free-form 3D shape but is a parametric model that is defined by a set of parameters.

Clause 11. A computer-implemented method of clause 10, wherein a first range of each parameter's value is divided among a set of bins of smaller second ranges, and the machine learning device is adapted to estimate the correct bin where a specific parameter belongs.

Clause 12. A computer-implemented method of clause 11, wherein a parameter relates to or represents a characteristic of a tooth surface anatomy, a tooth dentition, or a restoration type.

Clause 13. A computer-implemented method of clause 10, 11 or 12, wherein an output of the trained machine learning system is a representation of a 3D shape expressed as a set of parameters which defines an abutment or crown.

Clause 14. A computer-implemented method of clause of 13, wherein the set of parameters is a part of a parametric modelling.

Clause 15. A computer-implemented method of any of the clauses 1 to 14, wherein the machine learning system is adapted to use a discriminative ML algorithm.

Clause 16. A computer-implemented method of any of the clauses 1 to 15, wherein a patient's dentition comprises an upper and/or lower jaw, prepared and opposing jaws, missing tooth, implant, and tooth numbers.

Clause 17. A computer-implemented method of any of the clauses 1 to 16, wherein the restorative dental object is a crown, or an abutment for an implant.

Clause 18. A computer-implemented method of any of the clauses 1 to 17, wherein point samples are extracted on a 3D surface of jaw scan geometry adapted for input to an Artificial Neural Network (ANN) for each clinical case.

Clause 19. A computer-implemented method of any of any of the clauses 1 to 18, wherein a parametric model is trained using an ANN by mapping the input data to restoration dental object design parameters which are outputs of the ANN for all preexisting treatment 3D data sets in an end-to-end manner.

Clause 20. A computer-implemented method according to clause 19, wherein the trained machine learning model is saved as a set of computer files in a network location.

Clause 21. A computer-implemented method of clause 19 or 20, further comprising using classified parametric values in bins to determine parametric values for a new clinical case with input of 3D images.

Clause 22. A computer-implemented method according to any of the clauses 3 to 21, for a new clinical case of an implant-based restoration, the method comprising receiving input of a user design preference, patient jaw 3D scans, and an implant position and orientation from 3D scan data of a feature location object.

Clause 23. A computer-implemented method according to any of the clauses 18 to 22, wherein samples on the 3D surface of the jaw scan geometry are extracted in the same format as was used for training.

Clause 24. A computer-implemented method according to clause 22 or 23, the received input data is sent to one or more computing device, which processes the request and returns a set of predicted design parameters using the trained ANN model.

Clause 25. A computer-implemented method according to clause 24, wherein dental restoration objects of the 3D model are reconstructed from predicted design parameters and rendered to be presented to the user.

Clause 26. A computer-implemented method of manufacture of a dental object according to any of the clauses 1 to 25 the method manufacturing the dental object in accordance with a reconstructed shape of an abutment or crown.

Clause 27. A computer-implemented system for training a machine learning system, the machine learning system being installed on one or more computing devices, the system comprising means for training the machine learning system with a plurality of preexisting treatment 3D data sets, the 3D data sets comprising 3D images of patients' dentitions as inputs on one end of the machine learning system and 3D shapes of representations of patients' restorative dental objects on the other end as outputs.

The training of the machine learning system using a plurality of preexisting treatment 3D data sets can be performed in an end-to-end manner.

Clause 28. A computer-implemented system for providing a representation of a 3D shape of a restorative dental object for a patient, the system comprising:

means for inputting a representation of a 3D scan of at least one portion of a patient's dentition (e.g. via an I/O port or an interface), a representation of a 3D scan defining at least one implant position, the inputting being to a trained machine learning system installed on one or more computing devices, and means for identifying, using the trained machine learning system, a representation of a 3D shape of the restorative dental object for the implant wherein the output of the representation can be obtained within five minutes of receipt of scan data of the patient, alternatively within one minute of receiving scan data, and more preferably in less than 30 seconds of receiving scan data of a patient.

The identifying can be performed in an end to end manner.

Clause 29. A computer-implemented system for providing a representation of a 3D shape of a restorative dental object for a patient, the system comprising:

means for training, by one or more computing devices and using a plurality of preexisting treatment 3D data sets, a machine learning system, a receiver for receiving, by the one or more computing devices, a patient's 3D scan data representing at least one portion of a patient's dentition which defines at least one implant position, and means for identifying, using the trained machine learning device, a representation of a 3D shape of the restorative dental object for the implant.

The identifying of the representation can be performed within five minutes of receipt of scan data of the patient, alternatively within one minute of receiving scan data, and more preferably in less than 30 seconds of receiving scan data of a patient.

The training of the machine learning system using a plurality of preexisting treatment 3D data sets can be carried out in an end-to-end manner.

Clause 30. A computer-implemented system according to clause 29, wherein the means for identifying is adapted to operate in an end-to-end manner.

Clause 31. A computer-implemented system according to any of the clauses 27 to 30, comprising means for applying computer based end-to-end Machine Learning models.

Clause 32. A computer-implemented system according to any of the clauses 27 to 31, wherein the machine learning system is a neural network.

Clause 33. A computer-implemented system of clause 32, wherein the neural network is a CNN.

Clause 34. A computer-implemented system according to any of clauses 29 to 33, wherein the receiver is adapted to receive scanned 3D images of the mouth of a patient or 3D images of the mouth of a patient retrieved from an archive.

Clause 35. A computer-implemented system according to any of clauses 27 to 34, wherein the means for identifying is adapted to generate a 3D shape of the restorative dental object.

The restorative dental object can be for direct for attachment to the implant or via one or more intermediaries.

Clause 36. A computer-implemented system of clause 35, wherein the 3D shape is not a free-form 3D shape but is a parametric model that is defined by a set of parameters.

Clause 37. A computer-implemented system according to clause 36, wherein a first range of each parameter's value is divided among a set of bins of smaller second ranges, and the machine learning device is adapted to estimate the correct bin where a specific parameter belongs.

Clause 38. A computer-implemented system according to clause 37, wherein a parameter relates to or represents a characteristic of a tooth surface anatomy, a tooth dentition, or a restoration type.

Clause 39. A computer-implemented system of clause 37 or 38, wherein an output of the trained machine leaning system is a representation of a 3D shape expressed as a set of parameters which defines an abutment or crown.

Clause 40. A computer-implemented system of clause 39, wherein the set of parameters is a part of a parametric modelling.

Clause 41. A computer-implemented system according to any of the clauses 27 to 40, wherein the machine learning system is adapted to use a discriminative ML algorithm.

Clause 42 A computer-implemented system of any of the clauses 27 to 41, wherein a patient's dentition comprises an upper and/or lower jaw, prepared and opposing jaws, missing tooth, implant, and tooth numbers.

Clause 43. A computer-implemented system of any of the clauses 27 to 42, wherein the restorative dental object is a crown, or an abutment for an implant.

Clause 44. A computer-implemented system of any of the clauses 27 to 43, wherein point samples are extracted on a 3D surface of jaw scan geometry adapted for input to an Artificial Neural Network (ANN) for each clinical case.

Clause 45. A computer-implemented system of any of the clauses 27 to 44, wherein a parametric model is trained using an ANN by mapping the input data to restoration dental object design parameters which are outputs of the ANN for all preexisting treatment 3D data sets in an end-to-end manner.

Clause 46. A computer-implemented system of clause 45, wherein the trained machine learning model is stored as a set of computer files in a network location.

Clause 47. A computer-implemented system of any of the clauses 45 or 46, further comprising using classified parametric values in bins to determine parametric values for a new clinical case with input of 3D images.

Clause 48. A computer-implemented system of any of the clauses 28 to 47, for a new clinical case of an implant-based restoration, the method comprising receiving input of a user design preference, patient jaw 3D scans, and an implant position and orientation from 3D scan data of a feature location object.

Clause 49 A computer-implemented system according to any of the clauses 44 to 48, wherein samples on the 3D surface of the jaw scan geometry are extracted in the same format as was used for training.

Clause 50. A computer-implemented system of clauses 48 or 49, the received input data is sent to one or more computing device, which processes the request and returns a set of predicted design parameters using the trained ANN model.

Clause 51. A computer-implemented system of clause 50, wherein dental restoration objects of the 3D model are reconstructed from predicted design parameters and rendered to be presented to the user.

Clause 52. A computer-implemented system of any of the clauses 27 to 51, adapted to manufacture the dental object in accordance with a reconstructed shape of an abutment or crown.

Clause 53. A storage medium storing the parametric model according to any of clauses 1 to 26 or storing processor implementable instructions for controlling a processor to implement the method of any of the clauses 1 to 26.

Clause 54. Processor implementable instructions for controlling a processor to implement the method of any of the clauses 1 to 26.

Clause 55. A computer product comprising software for carrying out any of the methods of clauses 1 to 26, when executed on a digital processor using parametric modeling techniques.

Clause 56. Manufacturing of a customized restorative element made from a design generated any of the methods of clauses 1 to 26, the design being optionally of a custom abutment or crown for an implant.

BRIEF DESCRIPTION OF THE DRAWINGS

FIG. 11 shows measuring accuracies of selected abutment shape parameters within 0.5 mm (first column) and 1.0 mm (second column) respectively. The result is based on 70,000 training samples and ~7000 validation samples of upper left posterior (tooth #2, 3, 4, 5) in accordance with an embodiment of the present invention.

FIG. 14 shows acceptance rate comparison of the abutment designs between the ML-based method according to embodiments of the present invention and a conventional optimization method. Five different expert human designers examined 100 cases created by two different methods without the knowledge of the method each design was created by.

DEFINITIONS

Figure 1:
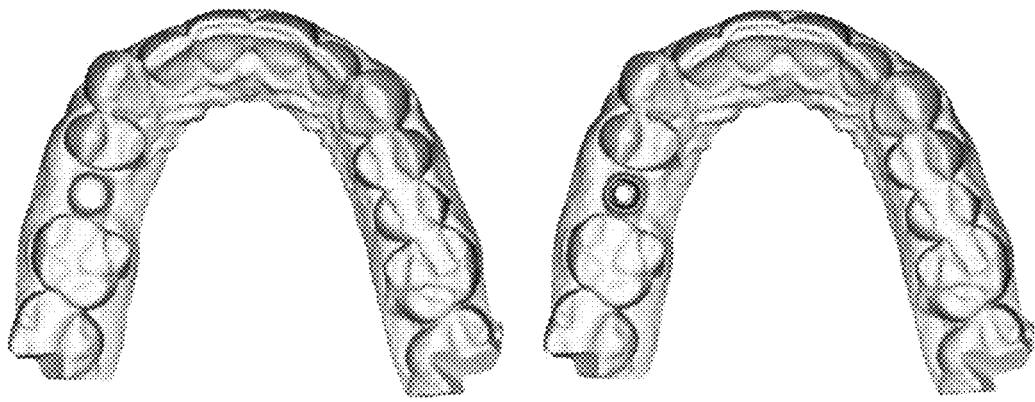
FIG. 1: End-to-end input and output of automatic abutment design according to an embodiment of the present invention. Left: raw 3D optical scan of a patient jaw. Right: Abutment design based on the given implant position and orientation.

"Probability vector" A probability vector is associated with a partition of a range of values of a model parameter. For example, the possible range of a single parameter value may be segmented into bins each being associated with a probability where the estimated value of the parameter falls into the sub-range the specific bin represents. An exact value of a parameter is therefore not necessary, merely that the probability is that a calculated parameter value lies within the range of one bin. Hence, parameter values are classified and not regressed.

"Restorative objects" include abutments for implants and crowns for single implants or single tooth stubs.

"End-to-end model": In a machine learning, usually a "deep learning" setup, an end-to-end model learns all the features that can occur between the original inputs (x) and the final outputs (y). In the present case x refers to 3D images of a patient's mouth whereas y refers to parameter values.

The term "end-to-end" as used in the present description refers to a method and system according to embodiments of the present invention having a machine learning model which, after being trained) can directly convert an input data into an output prediction while bypassing the intermediate steps that usually occur in a traditional pipeline of software components. A method and system according to embodiments of the present invention can handle the entire sequence of tasks. Additional steps, such as data collection or auxiliary processes, are not part of the end-to-end model unless the model can learn the intermediate processes with the given data.

"End-to-end input and output" In this application, the training of an Artificial Neural Network (ANN) is done with many examples that include the 3D image of the mouth of a patient at the start as an input and the final treatment plan as an output. The ANN finds the relation between the input on one end (raw scan data in 3D e.g. as a point cloud) and the output on the other end, e.g. abutment or crown parameters. The ANN is trained with a large number such examples, e.g. more than half million of different examples of such input & output.

"Training a neural network" The underlying element of a neural network is called a perceptron or an artificial neuron. A perceptron takes a series of inputs, performs a function on those inputs, and produces an output that can be passed to other neurons. For example the function can be a sum of weighted inputs. A neural network is many interconnected neurons. Neurons are grouped and connected in "layers". The output of one layer is connected to the next layer usually by an activation function. The Sigmoid, Tan H, or ReLU functions are common. Neural networks can grow in complexity by adding additional layers which are commonly referred to as "hidden layers".

Forward and back propagation are used to train the network and find better or optimal weights. After initializing weights, input data having a known outcome is pushed "forward" through the network resulting in an output prediction. A cost or loss function is used to calculate how far the prediction is from the expected result.

The error or cost is then reduced to a low level or to the lowest point possible i.e. to a global minimum. This can be achieved by using, for example, a gradient decent method. The goal of the gradient descent algorithm is to find the partial derivative of the cost function with respect to each weight. The direction (+/−) and slope of the cost function is used to determine how much to adjust the weights and in which direction in order to get to a low or zero cost. If the gradient is 0 a minimum has been reached. Starting at the output layer the gradient descent algorithm is "back" propagated to the next layer and further to the inputs. How much the weights need to be changed to get closer to that zero cost or low cost is calculated for each node of the neural network.

Further training of the neural network comprises forward and back propagation until the error has been minimized.

This procedure can be used to adjust the weights of a neural network in an end-to-end manner for use in embodiments of the present invention.

"Regression" and "classification" Parameter estimation is typically and usually a regression problem. For example, it includes estimating a "number" instead of a "class". In classification a first range of values, e.g. numbers can be divided into smaller bins each with a second smaller range (which can be called "classes") and have a machine learning system comprising an ANN estimate the correct bin where a specific parameter belongs.

"Human designer's specific rules" These rules are those typically used by a dental technician to design restorative dental objects. The rules can include how much pressure an abutment base could put against the surrounding soft tissue, how tall an abutment could be compared to its adjacent and opposing teeth, etc. . . .

An "underlying restoration model" (e.g. abutment or crown) is not a free-form 3D shape but is a parametric model that can be defined by a set of parameters (=numbers). For example, the shape of an abutment or crown model can be determined by a set of parameters (~60 numbers for abutment) completely, which is much more compact and controllable than a free-form model where the shape of such a model should be defined by a large number of points and triangles to connect them (i.e. a format to represent a generic 3D object)

A "Design of a dental object" as used in this application means:
a) a description in a machine-readable format of the 3D geometry of a dental object such that it can be manufactured or
b) a representation in a machine-readable format from which a 3D geometry of the dental object can be manufactured.

The design of the dental object is preferably done in function of patient-specific characteristics of the existing intra-oral situation i.e. remaining dentition, gums, etc.

Automating the design of customized dental objects is done by connecting end-to-end the following elements:
Training an Artificial Neural Network so as to find direct patterns between an input at one end of the process (i.e. an input for receiving raw 3D scan data which can be a point cloud) and an output at another end of the process without relying on any intermediate form of data in-between.
The input on one end, e.g. where data is entered is adapted for receiving input raw scan data. This data can be a digital representation of the (e.g. intra-oral) environment such as a 3D digital representation in the form of a point cloud, triangulated surface representation or the like. It is preferably 3D scan data in the form of a point cloud.
The output of the Artificial Neural Network is a machine-readable description of the dental object or a machine-readable representation of the dental object under consideration.

"Principal Component Analysis (PCA)" belongs to a class of projections of a higher-dimensional space into a lower dimensional space of objects. Preferably, as much information as possible is preserved. Mathematically this can be achieved by calculating eigenvectors of the covariance matrix. From these, n eigenvectors with the biggest eigenvalues can be used to project into n-dimensional space. Using these n eigenvectors it is possible to predict, or reconstruct any object that belongs to the class of objects under consideration.

"Approximated shape" means, with reference to a parametric model, that any difference between a proposed shape and the actual shape of a model comprises finding a set of parameter values such that the error term used to quantify the difference between the proposed shape and the actual shape is minimized. For every component of a representative training set comprising dental objects in their (intra-oral) environment, the parameter values are determined that yield the shape (or approximated shape) of that dental object when applied to the parametric model.

An "algorithm" is to be understood as a self-consistent sequence of steps leading to a desired result. These steps require physical manipulations of physical quantities, e.g. in the form of electrical or magnetic signals capable of being stored, transferred, combined, compared or otherwise manipulated.

DESCRIPTION OF THE ILLUSTRATIVE EMBODIMENTS

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality. It will be apparent to one skilled in the art that the present invention can be practiced in a variety of ways.

Embodiments of the present invention make use of Machine Learning algorithms for computer-implemented methods or systems of automatic restoration design. The restoration design includes the design of restorative dental objects such as abutments or crowns for an implant, e.g. a single implant or a crown for a tooth stub. Identifying the shape of a restorative dental object such as an abutment or crown for an implant can be performed within five minutes of receipt of scan data of the patient, alternatively within one minute of receiving scan data, and more preferably in less than 30 seconds of receiving scan data of a patient.

Software is provided for carrying out the methods when executed on a digital processor. Manufacturing of the restorative dental objects also included.

Embodiments of the present invention use 3D-scan data of patients' dentition as input into a neural network. The scan data can be in the form of a point cloud of a 3D image. Methods and systems according to embodiments of the present invention make use of ML algorithms that are executed on a processing device such as a microprocessor of a computer which can access a computer memory such as volatile and non-volatile memory.

Embodiments of the present invention also relate to a computer-implemented system adapted to use Machine Learning algorithms for automatic restoration design. The computer-implemented system is preferably specially programmed or constructed for the required purposes including computer programs. These can be stored in a computer-usable or computer-readable storage medium.

Furthermore, the invention may take the form of a computer program product which can be stored on a non-transitory machine-readable storage medium. The non-transitory machine-readable storage medium can be an electronic, magnetic, optical, electromagnetic, infrared, or semiconductor system (or apparatus or device) or a propagation medium. Examples of a non-transitory machine-readable storage medium include, but are not limited to, a semiconductor or solid state memory, magnetic tape, a removable computer diskette, a random access memory (RAM), a read-only memory (ROM), a rigid magnetic disk, an optical disk, an EPROM, an EEPROM, a magnetic card or an optical card, or any type of computer-readable storage medium suitable for storing data, images or electronic instructions, and each coupled to a computer system bus. Examples of optical disks include compact disk-read only memory (CD-ROM), compact disk-read/write (CD-R/W) and digital video disc (DVD).

The processing device such as a microprocessor with memory is adapted to store and/or execute program code and includes at least one microprocessor coupled directly or indirectly to memory e.g. through a system bus. The memory may include any local memory employed during execution of the program code. The computer system can include input/output (I/O) devices such as keyboards, displays, pointing devices or other devices configured to receive data or to present data that are coupled to the system either directly or through intervening I/O controllers.

Network adapters may also be coupled to the processing device to allow coupling to other data processing systems or remote printers or storage devices through intervening private or public networks. Modems, cable modem and network cards are examples of the currently available types of network adapters.

Embodiments of the present invention include methods, systems and software for automatic restoration design. The restoration design includes restorative dental objects derived from scan data of a patient's dentition using Machine learning, e.g. making use of a neural network. A patient's dentition data set can include one or more of the patient's scan data from multiple one or more scans of all or of parts of the patient's mouth with or without other parts of the patient's body such as a scan of one or more portions of a patient's jaw bone. The computer-implemented methods of automatic restoration design use a 3D electronic image of at least a portion of a patient's mouth as a starting point for the design process. In some embodiments, the electronic image is obtained by a direct scan of the patient's teeth. Embodiments of the present invention allow the capture of 3D images by a dentist or a dental technician or can be obtained by scanning one or more impressions of the patient's teeth. Embodiments of the present invention are suitable for use at the dentist's chair.

Embodiments of the present invention are based on the observation that the relationship between the design of a customized dental object and the input data from which the design is created can be learned by training a machine learning system or method by inputting (e.g. via an I/O port or an interface) and using many existing relevant examples of treatment plans and outcomes designed by human operators such as dental technicians. This could be considered a typical problem of Supervised Learning. Such an algorithm relates to a problem domain in which the input data is 1) the known implant type, position and orientation, 2) the 3D scan data of patient jaws (e.g. as point cloud), and 3) additional options (or customer preferences) on how the specific dental object needs to be designed. This information is complete and enough for a human designer to create a shape of a restorative dental object such as a customized crown and abutment shape. Human designers apply their dental knowledge and specific rules to design an abutment or crown that would fit to the dentition around the missing tooth in an optimal way based on the given input data. The output is a full restoration design, which could be further defined by a set of parameters that would uniquely define the shape, position, and orientation of an abutment or crown. The present invention relies on the underlying restoration model (e.g. of abutment or crown) not being a free form 3D shape but a parametric model that can be defined by a set of parameters (e.g. numbers).

Embodiments of the present invention use the full 3D data (e.g. an occupancy grid, a point cloud) as input to a ML system or method. The technical difficulty of using 3D data directly has been solved by this in embodiments of the present invention as well as by a 3D convolution operation applied by a Machine Learning system or method, e.g. implemented on a Convolutional Neural Network (CNN).

For embodiments of the present invention the input data is preferably in the form of 3D optical scans of patient jaws (shown in the left image of FIG. 1), e.g. as point cloud obtained by either the intra-oral scanning of patient's mouth or scanning of a plaster model created from physical impression. The implant position and orientation are typically known by using a separate process using detection of a scan body or feature location object (FLO) placed on the implant. Both the raw 3D scan data and implant position and orientation are the minimal input information that would be required for any type of implant-based restoration design whether it is done automatically or manually.

Given the input, the desired output is the design of a target restoration object (e.g. abutment or crown) that would require no or minimal changes to produce the final physical product out of it. The final restoration design (e.g. either abutment or crown) can be represented by either:

1) a generic 3D object format (e.g. triangle meshes connecting the dense points on the object surface) or
2) by a set of parameters that define the shape of an underlying model that was designed for a specific type of 3D object (e.g. abutment model or crown model). The right image of FIG. 1 is an example of the abutment model placed on the implant position.

Identifying the shape of a restorative dental object such as an abutment or crown for an implant can be performed within five minutes of receipt of scan data of the patient, alternatively within one minute of receiving scan data, and more preferably in less than 30 seconds of receiving scan data of a patient.

It is known from U.S. Pat. No. 9,814,549 (included by reference) that a flexible arch model (FAM) can be computed to capture and parameterize the variations of the multiple real dental arches in a training set to reconstruct missing teeth in a patient's dental anatomy. Building the FAM includes acquiring multiple sets of digitized dental arches with a pair of maxillary (upper) and mandibular (lower) jaws in the right relative position and gathering a pre-defined set of landmark points on the occlusal surface of each arch all in the same order and same corresponding positions across multiple samples. The gathered vectors of landmark points are used to perform statistical modeling (e.g. Principal Component Analysis) to create a linear subspace of the feature points with the basis of principal components (when PCA is used) found during the procedure. An arbitrary set of landmark points on a pair of upper and lower arches can be reconstructed by a linear combination of the principal components within a reasonable range of variations captured from the training samples.

It is known from US 2017/0095319 (included by reference) that a computer-implemented method can be used for designing a dental restoration component The method includes: receiving a set of design dimensional constraints which must be satisfied for the dental restoration component; receiving a set of design parameters for the dental restoration component: receiving a definition for a penalty function which takes into account at least more than one of said design parameters and which signals a constraint being reached when the value of any of said parameters violates a constraint; and using the penalty function, assigning a value to each of said design parameters for the dental restoration component, consistent with the constraints for said component.

It is known from U.S. Pat. No. 9,504,541 or US 2007/0154868 (all of which are included by reference) that a method can be used for designing a dental restoration component. A set of design dimensional constraints is defined which must be satisfied for the dental restoration component. A set of design parameters for the dental restoration component also is defined. Using at least in part a penalty function, a value is assigned to each of said design parameters for the dental restoration component, consistent with the constraints for said component, said penalty function taking into account at least more than one of said design parameters and which signals a constraint being reached when the value of any of said parameters violates a constraint.

A 3D statistical analysis is known from US2016/0224690 (which is included by reference) to generate a crown model using a statistical method (such as k-means clustering, principal component analysis (PCA), or similar statistical methods). This can result in a crown model that is missing sharpness details below the threshold of the statistical technique. A method is provided to add back the sharpness to the resulting model by combining a single full-featured example into the algorithms generating the statistical model. The end result is a crown model that is relatively simple to produce and manipulate in real time, yet maintains the anatomical sharpness of a natural tooth.

It is known from U.S. Pat. No. 7,551,760 or 7,362,890 or US 2008/0002869 or US 2006/0072810 (all of which are included by reference) that a three-dimensional-based modeling method and system can be used to make a design for dentistry and related medical (and appropriate non-medical) applications. Data capture means produces a point cloud representing the three-dimensional surface of an object (e.g., dental arch). Three-dimensional recognition objects are provided, particularly within those areas in the image field that have low image definition, and particularly in such of these areas that appear in overlapping portions of at least two images, to provide the three-dimensional image processing software with position, angulation, and orientation information sufficient to enable highly accurate combining (or "stitching") of adjoining and overlapping images. Alignment, and creation of aligned related objects or models thereof, such as maxillar and mandibular arches, is facilitated.

One known abutment model in the dental industry represents a wide range of customized abutment shapes based on more than 60 design parameters that can be fitted to a specific patient's dentition. Also a parametric model is known that is created by a statistical analysis of a wide range of actual teeth samples. These methods are specific examples of the parameter-based underlying restoration models.

Given a 3D scan of a patient jaw and the implant position and orientation on a missing tooth site, embodiments of the present invention enable creation of a system or method, e.g. a computer based system or method that can present a full restoration design proposal, e.g. 3D model of a restorative dental object like an abutment or a crown in, for example, a CAD/CAM format to the end user in a very fast way, e.g. in a few seconds or less and in a fully automatic manner. Embodiments of the present invention take advantage of the recent advance of Machine Learning (ML) and Artificial Intelligence (AI) and it is one of the aspects of embodiments of the present invention is to have a system learn underlying patterns between the input and output of a lot of actual examples, i.e. in an end-to-end manner. Embodiments of the present invention start from the existence of many actual dental clinical cases of restorative dental objects for implant-based restoration for which the starting position, e.g. a missing tooth, is known and the final treatment plan, treatment and result, i.e. the design of the restorative dental object, are known. The starting position, e.g. the missing tooth refers to one end of the process whereas the final treatment plan, treatment and result i.e. the design of the restorative dental object are the other end. Thus, methods according to embodiments of the present invention train a neural network such as a CNN with only the raw data and the final results, thus carrying out end-to-end machine learning. Traditionally end-to-end machine learning based on available information in the documentation of existing clinical cases has not been used. For example, Dental CAD Automation Using Deep Learning as described in US2018/0028294 A1, exploits the Machine Learning mainly to have the system classify the correct dental features around the dentition of a missing tooth, which is further used to estimate the crown restoration using a generative ML algorithm.

In contrast to this prior art disclosure the problem of the restoration design according to some embodiments of the present invention is solved by having the system learn the patterns between the end-to-end input and output, meaning that the input is the raw jaw scan, and the output is the final restoration design, e.g. in the form of model parameters, without requiring any pre-processing or intermediate feature detection process or processes, which makes the prediction process for the end user very quick while also being very reliable.

In embodiments of the present invention, one or more scans are performed of the patient's mouth. These scans can include some, any or all of an occlusal, lingual, or buccal scan. Contact areas of neighboring teeth can also be scanned. The plurality of scans can be combined into an underlying 3D digital model which includes an implant. The underlying 3D digital model is used to design a dental restoration (e.g., crown or abutment). In embodiments of the present invention a restoration design program is provide by a trained machine learning system and the restoration can be viewed by the patient and/or the dentist and/or the dental technician via a graphic interface. The interface may be adapted so that the dental technician or the dentist can refine the proposed restoration.

In embodiments of the present invention a machine learning system such as a neural network of which a CNN is one example, is trained using many training data sets which include only the raw image data and the final treatment plan and/or restorative dental object.

Embodiments of the present invention may employ a discriminative machine learning algorithm to determine a suitable dental restoration such as a crown, or an abutment for an implant. The discriminative machine learning algorithm can be trained to output a 3D representation or model of a crown or an abutment. The training sets are preferably restricted to those cases having the same type of restoration, for example, the training data sets can be to those involving crowns or abutments. Outputting the representation of a shape of a restorative dental object such as an abutment or crown for an implant can be performed within five minutes of receipt of scan data of the patient, alternatively within one minute of receiving scan data, and more preferably in less than 30 seconds of receiving scan data of a patient.

Figure 2:
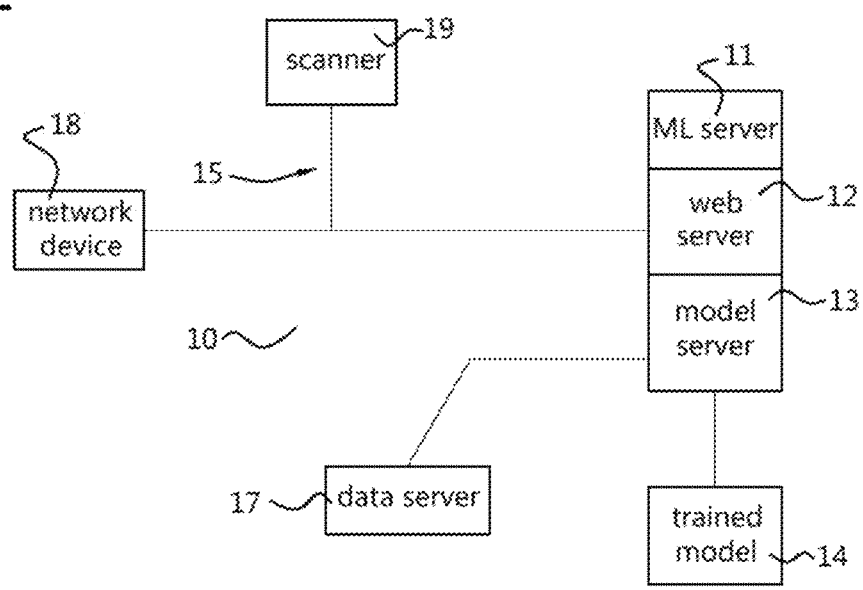
FIG. 2: network in accordance with an embodiment of the present invention.

In FIG. 2 a block diagram of a computer-implemented system 10 according to an embodiment of the present invention adapted for Machine Learning algorithms. The computer-implemented system is adapted to carry out a method for automatic restoration design according to embodiments of the present invention. The restoration design includes the design of restorative dental objects such as abutments or crowns for an implant according to embodiments of the present invention. System 10 can include an ML server 11 in a network 15, whereby the ML server 11 comprises a webserver 12, a model server 13 and a trained model 14. A scanner 19 is optional or can be located on different premises.

The network 15 enables communications with other devices on the network and can use standard telecommunications protocols. For example the network 15 may include a network device 18 for receiving 3D images, e.g. from a scanner 19. The network 15 may be a conventional wired or wireless network such as a local area network (LAN), a wide area network (WAN). The network 15 can include a cloud network using cloud computing techniques. The model server 13 is adapted to execute the ML algorithms according to embodiments of the present invention. The webserver 12 can be adapted to receive 3D images of a patient e.g. from network deice 18 including, for example scanned 3D images generated by scanner 19. After the model server 13 has prepared the restorative design based on these images, the webserver 12 can be adapted to send the complete restoration design to the dental technician or the dentist, e.g. who can access network device 18. The complete restoration design can be in the form of parameter values.

The model server 13 and the model 14 can be trained for automatic design of a restorative dental object with preexisting 3D dental images and restorative dental objects design by human experts from these images. The model server 13 may be adapted to operate a neural network such as a CNN. Many training data sets from real dental patients with one or more crowns or abutments can be selected to form a group of training data sets specifically for a crown or an abutment. The ML server 11 may be in communication with a data sever 17 which stores a database of preexisting 3D dental images and restorative dental objects designed by humans.

In embodiments of the present invention, weights of nodes of the CNN can be trained to minimize error. A CNN network architecture according to an embodiment of the present invention comprises a CNN which consists of, or comprises a number of layers, including optionally a normalization layer, further convolutional layers and also fully connected layers.

The first layer of the CNN can optionally perform image normalization. The normalizer can be hard-coded and does not need to be altered in the learning process. Performing normalization in the CNN allows the normalization scheme to be altered with the CNN architecture and to be accelerated via GPU processing.

The convolutional layers do not need to perform feature extraction. Following the convolutional layers there are fully connected layers leading to output parameter values. Training the CNN is done end-to-end using the existing treatment data.

Embodiments of the present invention are based on Machine Learning and can make use of an Artificial Neural Network framework (ANN) for Supervised Learning. Methods or system according to embodiments of the present invention are based on using a known set of a great number of examples of inputs and outputs being designs of restorative dental objects. The training is done with preexisting 3D dental images and restorative dental objects designed by human experts from these images. The neural network can be in a training or an operative state.

Figure 3:
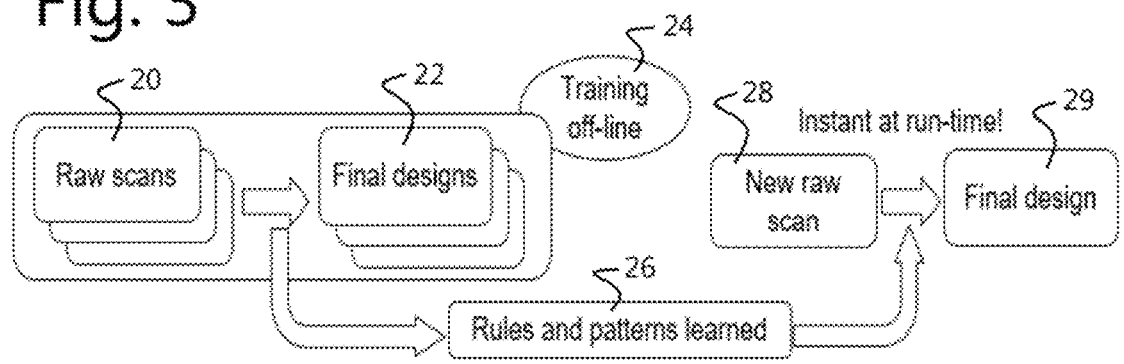
FIG. 3: shows a method and system for automatic design of dental restoration objects using Machine Learning in accordance with an embodiment of the present invention.

Referring to FIG. 3 the input for training is a very great number of raw optical 3D scans 20 of past clinical cases received from patients, and the outputs are the corresponding designs 22 of the abutments and crowns generated by humans. The designs 22 are preferably defined by model parameters and can be generated by human restoration design technicians and stored in a database. This training step 24 can be computationally heavy and is preferably carried out offline by high performance GPUs (Graphics Processing Unit).

The training step 24 can be carried out only one-time offline using all past existing datasets and, hence, there need not be tune pressure for the training. During this training step 24, the ANN will learn the implicit patterns 26 and/or rules relating all the input training data with corresponding output training data. Once the model has been trained and created, the neural network can be placed in the operative state or on-line mode and the learned patterns 26 can be used immediately when a new input 28 is given to the system. Also the prediction of the output design 29 from the new input 28 can be generated instantly using the ANN in an end-to-end on-line mode. In addition to the instant prediction time, other benefits of embodiments of the present invention can include one or more or all of:

1) there is no need to write explicit, hand-crafted, complex algorithms to incorporate the rules and patterns intermediate the input and the output,
2) the training step 24 will find the rules and patterns 26 in a good or in an optimal way that would be hard to find by humans or by other traditional computational approaches, and
3) the output 29 will not be sensitive to the qualities of any intermediate detection process or other sub-components.

Hierarchical Training & Prediction

Embodiments of the present invention include a hierarchical training approach comprising training important individual parameters and/or dividing the remaining design parameters into different groups depending on their relative dependencies in terms of the coordinate system on which their values are interpreted. Thus, the hierarchical training approach refers to the ranking of the importance of one or more parameters (which are used for defining the overall shape of a structure such as a restorative dental object) with respect to other parameters of the same parametric model. Independent of the level within the hierarchical all of the parameters relate to the entire abutment, the entire crown, etc. The rotation parameter is the most important one, which can be trained first with the input scans in the implant coordinate system. Angle and position parameters can then be trained (e.g. each one on its own or within a group) based on the input scans normalized by the known rotation angles. Then the training of the rest shape parameters (e.g. each one on its own or within a group) can be done based on the input scans normalized by the known position and other angles. Based on the experimental results, this hierarchical training approach can provide significantly better accuracy results compared to training all parameters with the input scans in one single coordinate system.

Correspondingly, the same hierarchical approach can be followed during the prediction step. When the new input scan and FLO detection is given, first, the input scan is transformed into the implant coordinate system (known from FLO detection), and the parameter value of the most important parameter is predicted with such input scan. Then, the input scan is further transformed based on this and other predicted parameter values, and these additional parameters are predicted with such input scan. Finally, the input scan is further transformed based previously predicted parameters, and the rest of the parameters are predicted with such input scan. Hence, embodiments of the present invention can optionally include a hierarchical parameter prediction approach comprising predicting important individual parameters and/or dividing the remaining design parameters into different groups depending on their relative dependencies in terms of the coordinate system on which their values are interpreted. The prediction then starts with the prediction being only for each of the most important parameters separately and individually. Afterwards the less important parameters may be predicted in groups. Thus, the hierarchical training and the hierarchical predicting refers to the ranking of the importance of one or more parameters (which are used for defining the overall shape of a structure such as a restorative dental object) with respect to other parameters of the same parametric model. Independent of the level within the hierarchical all of the parameters relate to the entire abutment, the entire crown, etc.

Hence, training and/or predicting using a computer in in a hierarchical manner comprises training and/or predicting more important parameters or parameter groups first or early on in the training or predicting process. These important parameters are related to dental object shape as defined by the underlying parametric model of dental objects, i.e. of the entire abutment, the entire crown, etc. Thus, the hierarchical training and/or the hierarchical predicting refers to the ranking of the importance of one or more parameters (which are used for defining the overall shape of a structure such as a restorative dental object) with respect to other parameters of the same parametric model. Independent of the level within the hierarchical all of the parameters relate to the entire abutment, the entire crown, etc.

In the following indications are given of certain parameters which have been shown to be important for abutments or crowns but these are given as examples and priorities may be different for different applications. These different priorities and different applications are included within the scope of the present invention.

Rotation Parameter Estimation

Figure 4:
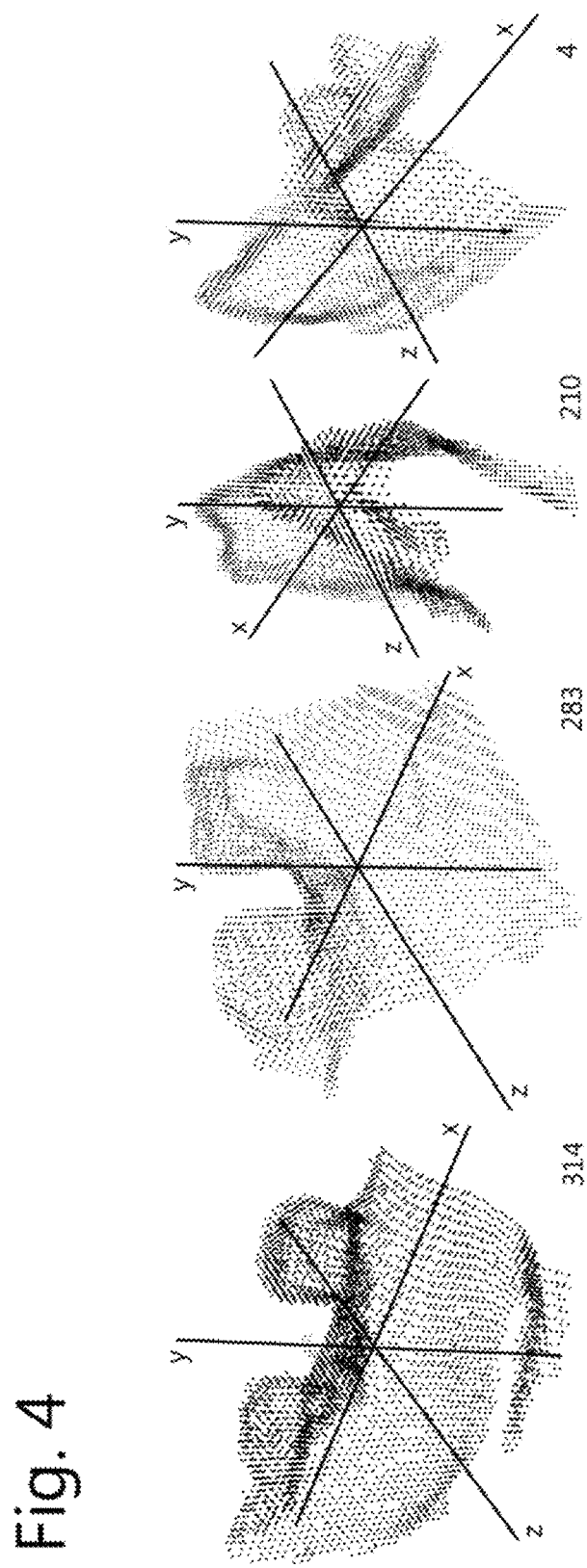
FIG. 4: Examples of input scans transformed into implant coordinate system with associated rotation values of the designed restoration objects, in accordance with an embodiment of the present invention.

One example of an important design parameter to estimate correctly in dental restoration design is a rotation parameter. In particular a rotation parameter which determines the correct facial or buccal side of the restoration object has been found to be most important. For example, even slight misplacement of the rotation can be easily detected by human eyes and it also would affect the determination of other parameters of the horizontal angles or other shape parameters. The rotation value can be determined relatively from the direction of the locking feature of the implant (f vector in FIG. 5). The FLO detection process will provide this horizontal implant direction and this will be the necessary input information to determine the correct rotation value. Because this horizontal implant orientation (f vector in FIG. 5) and the vertical implant orientation (u vector in FIG. 5) are known, this information can be embedded into the raw scan if the raw scan is transformed to be in this implant coordinate system. This way, a separate input for implant orientations besides the transformed raw scan would not be needed. FIG. 4 shows a few examples of the transformed input scans (e.g. resampled surface points) with different associated rotation values. Please note that the transformed input scans with the similar rotation value would show similar global point distribution in spite of the small difference of the shape of individual scans. This global point distribution would be the strong indication for the prediction of the right rotation value and the training step by a 3D Convolutional Neural Network (CNN) has been found to be very good at finding this pattern.

Core Angle Parameters Estimation

Bucco-lingual angle: This parameter determines how much the restoration part is angled bucco-lingually relatively to a vertical implant axis.

Mesio-distal angle: This parameter determines how much the restoration part is angled bucco-lingually relatively to the vertical implant axis.

These two restoration angle parameters (a.k.a core angles) are next important parameters to the rotation angle and have also global impacts on the rest of restoration shape parameters. However, unlike the rotation angle, these core angles would not be governed by the rotational aspect (f vector in FIG. 5) of the implant, but only by the vertical orientation (u vector in FIG. 5) of the implant. To remove the unnecessary degree of freedom to estimate, we transform the input scan again based on the known rotation value of each data sample (i.e. rotating along the vertical implant axis by the amount of the known rotation value) to train these two parameters, which has been proven to be more effective than training them from the implant coordinate system.

Restoration Position Parameters

Bucco-lingual offset: This parameter determines where the restoration part is positioned bucco-lingually relatively to the center of the implant.

Mesio-distal offset: This parameter determines where the restoration part is positioned mesio-distally relatively to the center of the implant.

These two parameters are equally important to the two core angle parameters in a sense that they determine the location of a restoration part (i.e. how much it is shifted from the center of the implant) once the rotation value is set. Therefore, it is important to train these two parameters using the input samples transformed by the known rotation values (i.e. using the normalized input samples after removing the rotation variation).

Abutment Shape Parameters

Figure 12:
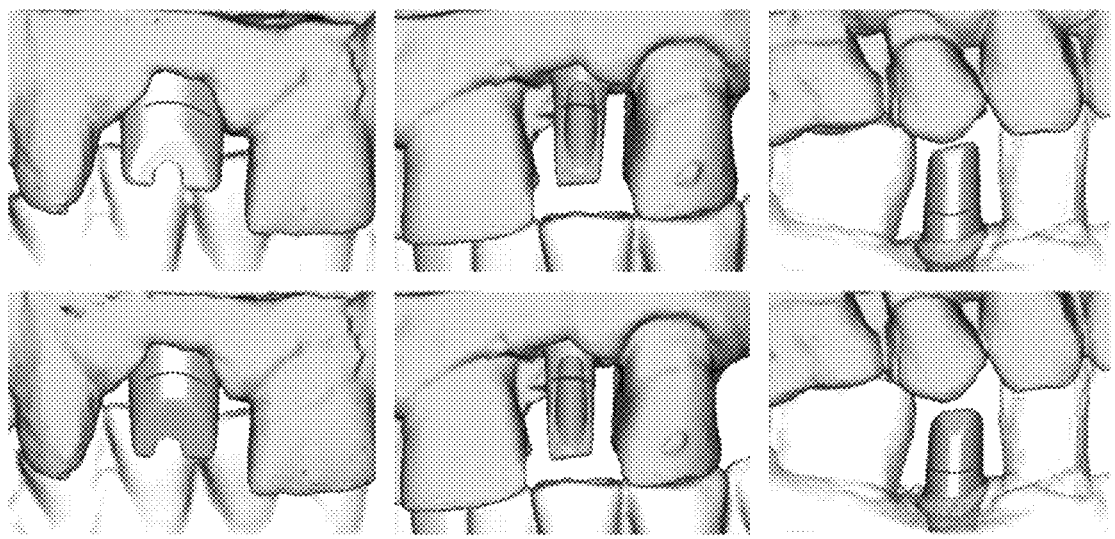
FIG. 12 shows in the upper row: abutment designs created by human designers. Lower row: abutment designs predicted by Machine Learning models according to embodiments of the present invention.

The rest of design parameters (of either abutment or crown) except the five global angle and position parameters described above are mostly governing the local size or shape of the restoration part. Some examples of such abutment design parameters include facial cusp height, mesio-distal width of margin, shoulder width, facial margin height, and many more depending on the specific underlying model. Expert designed Abutment models can have more than 50 such parameters that would define a unique shape of an abutment in wide range of geometrical variation. FIG. 12 shows some examples of Abutments created by a few different sets of parameters. These abutment shape parameters are all defined in the coordinate system that can be determined by the five global parameters, which we call the "core coordinate system". This means that it would be beneficial to transform the original input scan into this core coordinate system to train the rest of parameters by removing the variation of those global parameters.

Crown Measurement Parameters

Unlike the abutment, crown restoration part needs to look like a natural tooth which has biological shape and its full anatomical shape is difficult to describe with a small number of parameters that are associated with some direct geometrical meanings. Understanding this limitation but still to be able to train the crown model with some overall size and shape (without full anatomical details), we measure each sample of 3D anatomical crown created by human designers on the following five parameters: facial cusp height, lingual cusp height, mesio-distal width, bucco-lingual width, cusp angle. Then we train on these measurement parameters in the same "core coordinate system" we use for abutment shape parameters.

A crown design can be built upon a statistical method called Principal Component Analysis (PCA) which is considered one of the Unsupervised Machine Learning techniques. With this method, a full anatomical shape of a crown can be represented with a compact representation such as using a small set of parameters called "PCA parameters", which provides a way of producing the full anatomical shape of a crown in a wide range of variation, combined with the average shape of the crown. These PCA parameters can be trained in an end-to-end manner and the system can learn the patterns between the given input scans and the PCA parameters to address the full anatomical details using the Machine Learning framework described above. For this method a large number of real-world clinical crown samples are required 1—Time Preparation Incl. Training This embodiment has the following steps:

Step 1: Create or obtain a parametric (mathematical) model of the dental object to be designed, and also capturing its modes of variation.

In a preferred embodiment, this parametric model is an Active Shape Model (ASM) generated by applying Principal component analysis on a training set of (example or reference) dental objects. The model may capture true shape variation as well as positional and scaling variances.

According to another embodiment the parametric model is developed for a specific type of component based on empirical or expert defined rules. Said parametric model may or may not capture the positional variations of the dental object relative to a defined coordinate system.

Step 2: For every dental object of a representative training set comprising dental objects in their (intra-oral) environment, determine the parameter values that yield the shape (or approximated shape) of that dental when applied to the parametric model.

If the parametric model is an ASM, the representative training set of objects can be the training set used to generate said ASM. The parameter values to be determined are the weighting factors for each of the eigenvectors, the linear combination of which determines the shape of the dental object. To determine the parameter values, an iterative search algorithm can be used to fit the statistical component model (ASM) to the dental object in the training set.

In some cases, the parameter values for the representative training set may already be known. This for instance can be the case when said training set comprises dental objects that were originally designed using the parametric model for a corresponding intra-oral environment.

Step 3: Specify for every parameter in the parametric model, the hierarchy of training (i.e. which parameter or group of parameters to train for first).

According to one embodiment, the hierarchy is identical for every parameter e.g. when for the created parametric model there is no dependency of the shape variations of the dental object on its positional/scaling variances.

According to another embodiment, training of the parameters of the model that determine the position of the dental object relative to its environment is done first.

Step 4: For every parameter (alone, that is train each parameter on its own or in a group of parameters) in the parametric model, train an Artificial Neural Network to learn the implicit patterns between all the training input data sets (i.e. all digital representations of the (intra-oral) environments of the training sets) and the corresponding output data (i.e. all parameter values for the same parameter as determined for every dental object of the training set).

The input 3D scan data can be in the form of a point cloud. The training is done according to the hierarchy specified in step 3. This means that each parameter or groups of parameters are trained separately from other parameters or groups of parameters. It has been found that attempting to train all the parameters together does not lead to good results.

According to a preferred embodiment, training of each parameter is done based on the input after normalization by (one or more of) the previous parameters.

Operational Mode (Design Automation)

Step 1: Provide a digital representation of the patient specific (intra-oral) environment to the Artificial Neural Network which was previously trained as to yield the parameter values for the parametric model of the dental object, based on the learned patterns as described above. The input data can be 3D scan data which can be in the form of a point cloud.

Step 2: Apply the parameter values to the parametric model to establish a geometrical description of the desired patient specific dental object or establish a representation of a geometrical description of the desired patient specific dental object from which the dental object can be manufactured. This can be done in a hierarchical manner by predicting, for example, a single parameter and then groups of parameters.

Step 3: Translate (if required) the geometrical description of the dental object into a machine-readable description of the dental object that can be used to command a manufacturing device (e.g. milling unit, 3D printer, spark-erosion device or the like) to manufacture the dental object. Alternatively translate (if required) the representation of the geometrical description of the desired patient specific dental object into a machine-readable description of the dental object that can be used to derive commands to be provided to a manufacturing device (e.g. milling unit, 3D printer, spark-erosion device or the like) to manufacture the dental object.

Input Data Generation

Embodiments of the present invention formulate the input scan data for training and prediction. Other known systems use 2D data or 2.5D data (e.g. 2D image with depth information on certain direction) for their Neural Network input due to some technical difficulties experienced in adopting the full 3D dataset as the source of training input. Apparently those 2D and 2.5D dataset loses some of the full information that the 3D input scan data can represent.

3D Occupancy Grid

Figure 5:
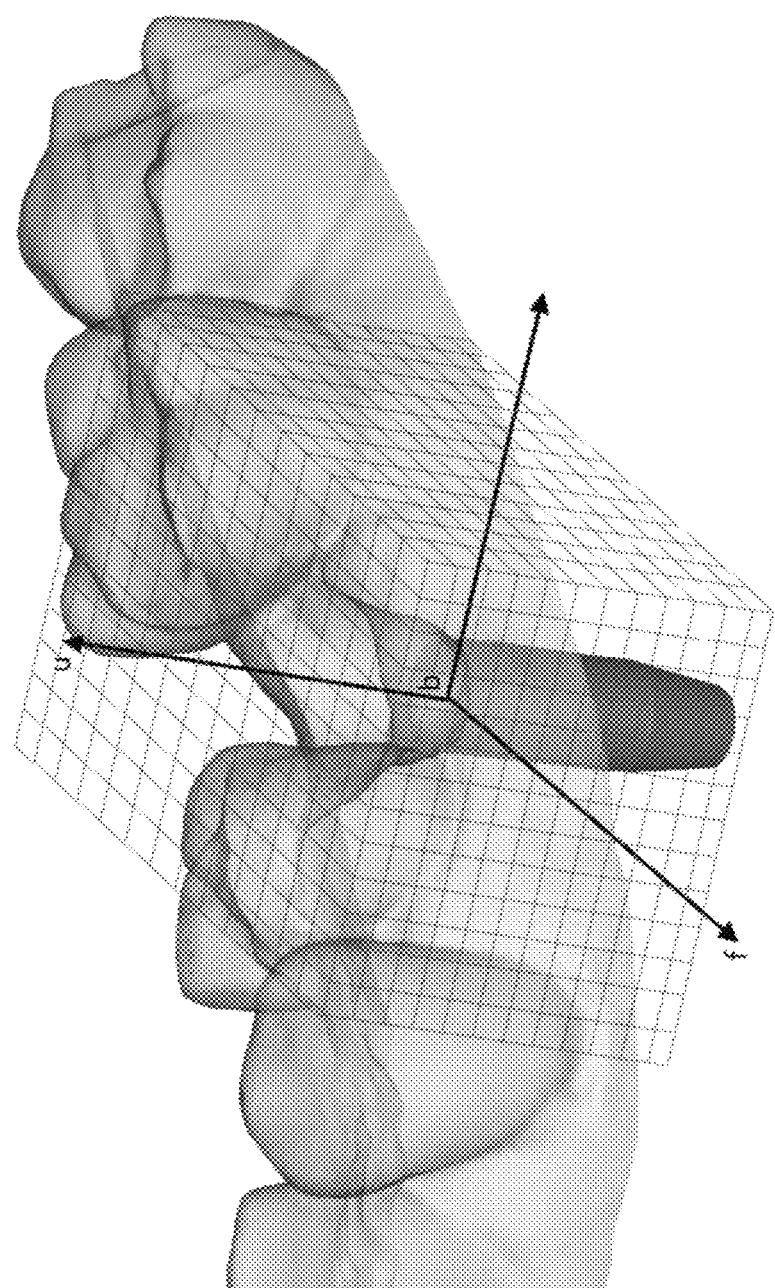
FIG. 5: Sampling surface points of input scan in implant coordinate system using 3D occupancy grid in accordance with an embodiment of the present invention.

Embodiments of the present invention use the full 3D input scan data. One option for the representation of 3D input data which can be used in embodiments of the present invention is a representation called "3D Occupancy Grid" (FIG. 5). Given the implant position and orientation (b, f, u in the FIG. 5), the input scan is first transformed into this implant coordinate system. Then the N×N×N 3D grid is defined which can cover specific geometric length on each axis. Then each voxel on the grid can be filled with 1 when the surface of the scan overlaps with the voxel, and 0 otherwise. This way the existence of the surface on the input scan with the N×N×N 3D binary data is represented. N=40 for example and 1 inch coverage on each axis, and this 40×40×40 binary data allows training of them comfortably with the limitation of 8 GB GPU memory. Though it's not shown in the FIG. 5, it is preferred to include both the cast scan where implant exists and its opposing cast scan together (whenever such a scan exists) in the same occupancy grid.

Selecting the coverage of the occupancy grid starts with a given resolution of the occupancy grid which is set by the limitation of GPU memory. The occupancy grid can cover a wider range of scans by sampling the surface data less densely, with the trade-off of losing some details on the surface. Since a main goal is to find the end-to-end pattern between the input scan data and the final restoration design on implant, the most relevant information on the input scan resides nearby the implant location including immediate neighboring and opposing teeth. Based on the multiple experiments, it has been found that around about a 1-inch coverage on each axis would provide most accurate results with the given grid resolution.

Auxiliary Input

In addition to the input of the scan data and implant position and orientation, other input information can be obtained that can provide more clues about the final restoration design during training. It is preferred that such auxiliary data is included into training only if the same information is available at the prediction time as well. The additional information can be tooth number, design preferences, and implant types and corresponding specifications. Among them, tooth number is useful to help increase the accuracies of the training and prediction. Then there are certain optional design preference information that the customers provide when they place an order, with which it would be useful to create some specific designs based on the options (e.g. how much sub-gingival depth of the abutment margin needs to be).

Neural Network Architecture

3D Convolutional Neural Network

Figure 6:
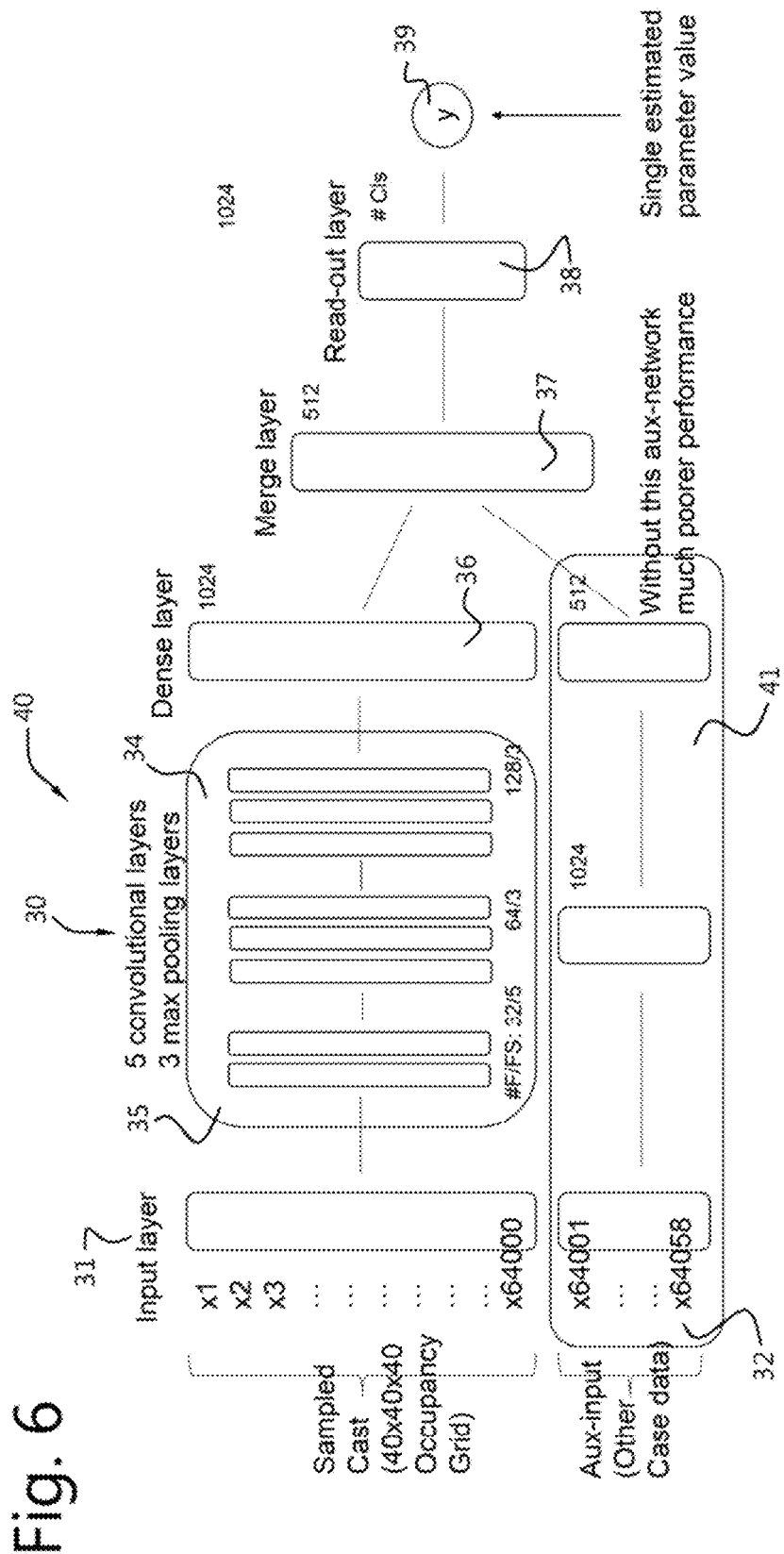
FIG. 6: Neural network architecture using 3D CNN and auxiliary input combined with 3D occupancy grid in accordance with an embodiment of the present invention.

Convolutional Neural Network (CNN) is a preferred network structure for use in embodiments of the present invention. The CNN is used to find the patterns between the sampled input scan data (e.g. an occupancy grid) and the final design parameters in an end-to-end manner. CNN is a known general neural network structure. In embodiments of the present invention it can be used to find the geometrical features (2D or 3D) in input data that are relevant to discriminate the labels (i.e. known outputs). Since the input is 3D e.g. a 3D occupancy grid, it is convenient to use 3D convolutional filters to improve or maximize the performance. Although skilled persons may consider the use of 2D convolutional filters could make the training step faster, the experimental results show that using the 3D operation always provides better results. FIG. 6 shows an embodiment of the present invention comprising a dedicated neural network architecture 40 with a neural network 30 having a number of layers such as a number of pooling layers 34 and a number of convolutional layers 35. The number of pooling layers 34 can be 3 as a maximum and the number of convolutional layers 35 can be five. Alternatively, pre-built networks or pre-trained models can be used. Note that this specific architecture shown in FIG. 6 is just one example that can implement a Machine Learning formulation for dental restoration design according to embodiments of the present invention. ML included in embodiments of the present invention can be implemented with other neural network architectures as long as such network can find the relationship or patterns between the inputs and outputs effectively in an end-to-end manner. For example, a neural network structure called "PointNet" can be used in embodiments of the present invention—see for example Charles R. Qi, Hao Su, Kaichun Mo, Leonidas J. Guibas, PointNet: Deep Learning on Point Sets for 3D Classification and Segmentation, CVPR 2017.

Handling Auxiliary Input

As shown in the block diagram in the FIG. 6, the geometrical input (e.g. an occupancy grid) 31 is fed into the 3D CNN 30 and the auxiliary input 32 (e.g. tooth numbers, design preference etc.) is fed into separate densely connected layers 41, which are eventually merged in layer 37 with the dense layer 36 of the output of the 3D CNN 30. After merger in merge layer 37 the output of that layer is connected into the final read-out layer 38 (e.g. a softmax layer) which outputs a parameter value or parameter values 39. These parameter values are used to define the shape and position of restorative dental objects by inputting these parameters into the underlying parametric model. This structure of handling auxiliary input 32 separately from 3D scan data 31 is very effective in making the overall performance much better than using only the 3D input data 31 or treating them as a combined input to the CNN.

Conversion of Regression Problem to Classification Problem

An optional feature which helps to achieve high accuracies of training and prediction is to re-formulate a regression problem (i.e. estimating a value number of a parameter) into a classification problem (i.e. estimating a class among multiple choices of classes). The estimation of a parameter (i.e. a number) is inherently a regression problem. It is not difficult to build a network to solve the regression problem and this is included as an embodiment of the present invention. However, it has been found that it is less relevant to estimate exact or highly precise parameter values since there is no single parametric design value that is absolutely correct in each design. Instead there exists some acceptable range of values for each parameter. Therefore, it is adequate if the predictive value is in a certain range from a known (target) parameter value. Based on this observation, in embodiments of the present invention ranges of numbers defines smaller bins ("classes"). The Neural Network 40 in FIG. 6 is used to estimate the correct bin to which a specific parameter belongs. This is much more effective and has provided far better results than training the system to estimate the exact or highly precise values of the parameters.

Softmax and Gaussian Softner of One-Hot Encoding

Figure 7:
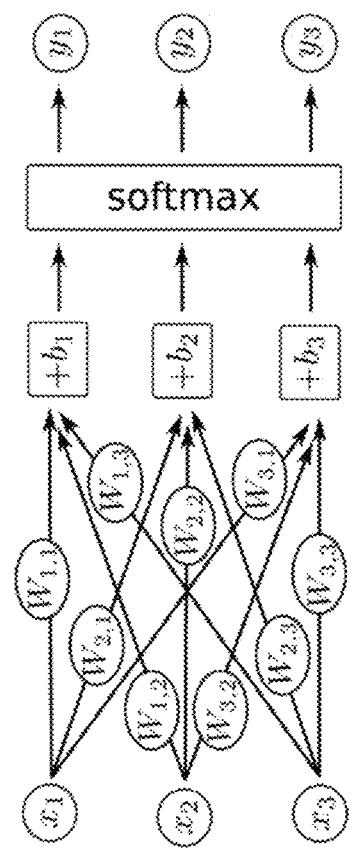
FIG. 7: Softmax operation and its usual placement in the neural network structure in accordance with an embodiment of the present invention.

Softmax is a standard form of the output layer 38 of the Neural Network architecture 40 as shown in FIG. 6 which is used to solve the classification problem (see FIG. 7). This binning into ranges is often interpreted as a "probability vector" because each class (bin) is given one probability number (between 0 and 1) after applying this softmax operation. During the training process, this softmax output (or probability vector) is generated by the neural network 30 on each input sample 31 and is compared to the known correct value (label) represented by "one-hot encoding" format. For example, if there exist five classes, the softmax output would be a vector of five probability values [0.1, 0.2, 0.5, 0.1, 0.1] and the correct answer (let's say it's the third class) in the form of "one-hot encoding" would be [0, 0, 1, 0, 0]. Then these two vectors are compared and the training algorithm will penalize the answer estimated by the network based on their similarities. However, in embodiments of the present invention, it is considered to be inappropriate or not balanced to penalize the second and the fourth classes the same way as the first and fifth classes because the second and fourth classes are closer to the correct (third) class. Based on this observation, there is an additional operation of discrete Gaussian filter in embodiments of the present invention against the one-hot encoded vector [0, 0, 1, 0, 0] resulting in the second and fourth classes being penalized less than the first and fifth classes when compared to the network-generated softmax output [0.1, 0.2, 0.5, 0.1, 0.1]. According to practical experiments, implementing this feature of Gaussian softner against the raw labels can result in some significant improvement in the accuracies on certain set of parameters.

Building Systems

Figure 8:
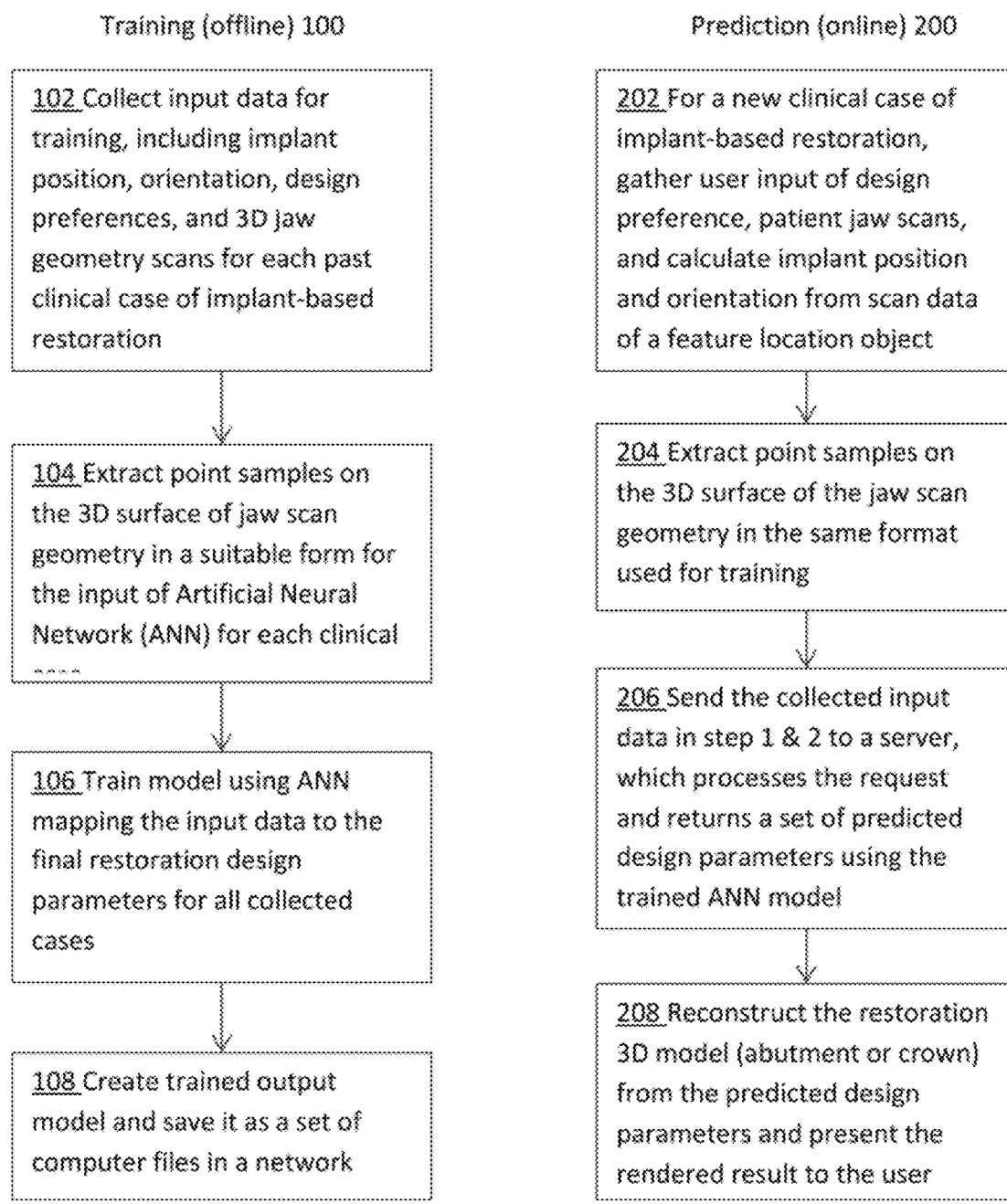
FIG. 8: Process of training the ANN model (left) and predicting designs using the trained model (right) in accordance with an embodiment of the present invention.

Once the model has been trained on each design parameter, all trained models can be deployed on a Machine Learning computing device such as a server and they can be used for the prediction of the parameter values on a new input data. FIG. 8 describes two complementary processes that such a system is using according to embodiments of the present invention. One method 100 is for the offline training process and the other method 200 is for the online prediction system for end users. In method 100 input data for training is collected in step 102, including some any or all of implant position, orientation, design preferences, and 3D jaw geometry scans (e.g. as point cloud) for each past clinical case of implant-based restoration. In step 104, point samples are extracted on the 3D surface of jaw scan geometry in a suitable form for the input to an Artificial Neural Network (ANN) for each clinical case. In step 106 the model is trained using an ANN by mapping the input data to the final restoration design parameters (outputs of the ANN) for all collected cases in an end-to-end manner. In step 108 the output model is trained and saved as a set of computer files in a network location. The ANN is now trained in an offline mode and is ready for use in an operative mode (e.g. online mode) to use the classified parametric values in bins in order to determine parametric values for a new input case.

In method 200 for a new clinical case of implant-based restoration, user input of design preference, patient jaw 3D scans are gathered (e.g. as a point cloud), and an implant position and orientation from 3D scan data of a feature location object are calculated in step 202. In step 204, point samples on the 3D surface of the jaw scan geometry are extracted in the same format as used for training described above. In step 206, the collected input data in steps 1 and 2 are sent to computing device such as a server, which processes the request and returns a set of predicted design parameters using the trained ANN model. In step 208, the restoration elements of the 3D model e.g. abutment or crown are reconstructed from the predicted design parameters and rendered to be presented to the user. The dental object can then be manufactured in accordance with the shape of the abutment or crown.

Figures 9, 10:
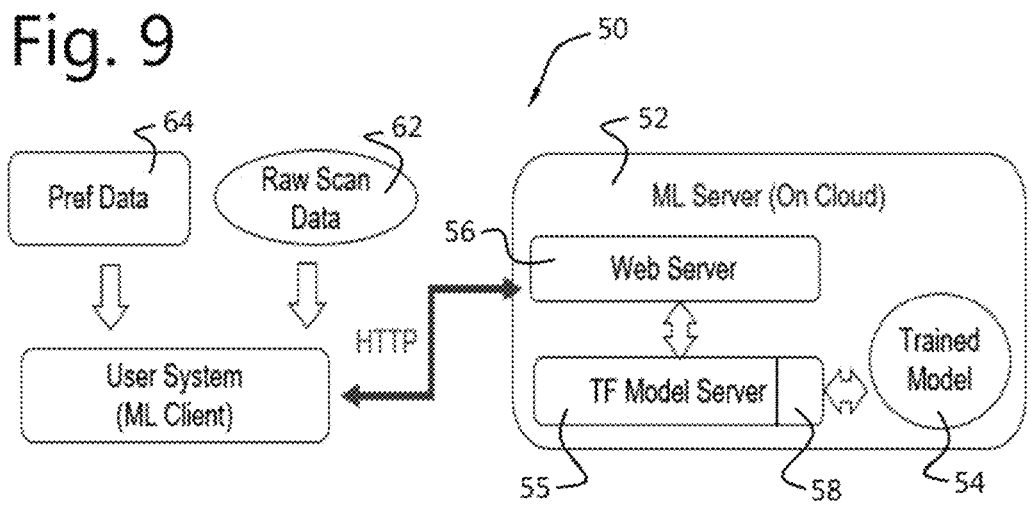
FIG. 9: A client-server system in accordance with an embodiment of the present invention where the trained restoration design models can be served from cloud servers directly upon the request of end users.
FIG. 10 shows measured accuracies within x degrees of rotation parameter against the 776 validation set after training with 17632 samples of tooth #5 comparing to other methods. First column: Accuracies within x degree: 0=exact match. Second column: Accuracies obtained using our new method (3D CNN-based) and the number of cases within the given accuracies. Third column: Accuracies obtained using method of the present invention based on the non-linear multi-dimensional numerical optimization. Fourth column: Accuracies measured on 25 different cases, each of which was designed by 12 different human designers (total 300 samples).

FIG. 9 depicts an example client-server system 50 wherein the trained restoration design models are served from a cloud-based server 52 directly upon the request of an end user. System testing based on the presented setup shows that the response time from the cloud-based Machine Learning server 52 to the end user is as fast as 5 seconds for the full restoration design including abutment or crown on one implant site.

Referring to FIG. 9 the trained model 54 has been trained with a very great number of raw optical 3D scans of past clinical cases received from patients, and the outputs which are the corresponding designs of the abutments and crowns are stored on server 52. Server 52 can comprise a TensorFlow™ model server 55 and a web server 56 for communication with the users. The designs are preferably defined by model parameters and can be generated by human restoration design technicians and stored in a database. During training, the ANN 58 will learn the implicit patterns and/or rules relating all the input data with corresponding output data in an end-to-end manner. As the model has now been trained and created, the neural network 58 is in the operative state or in the on-line mode and the learned patterns can be used immediately when a new input 62 is given to the system as well as any auxiliary data 64. The prediction of the output design from the new input 62 and 64 can be generated rapidly using the ANN 58 in an end-to-end on-line mode. This can be transferred to the user via the web server 56. In addition to the instant prediction time, other benefits of embodiments of the present invention can include one or more or all of:

1) there is no need to write explicit, hand-crafted, complex algorithms to incorporate the rules and patterns intermediate the input and the output, and
2) the output design will not be sensitive to the qualities of any intermediate detection process or other subcomponents.

Experiments and Results

In FIG. 10, a comparative experimental result on the accuracies of a rotation parameter estimation by a Machine Learning system according to embodiments of the present invention is presented. The result shows significantly better accuracies obtained by the ML system and method according to embodiments of the present invention than the accuracies obtained by a current system based on multi-dimensional numerical optimization method, and similar accuracies to the variation of human designers Measuring the accuracies within x degrees of rotation parameter against the 776 validation set after training with 17632 samples of tooth #5 are compared to other methods. First column: Accuracies within x degree: 0=exact match. Second column: Accuracies obtained using a method according to the present invention (3D CNN-based) and the number of cases within the given accuracies. Third column: Accuracies obtained using our current method based on the non-linear multi-dimensional numerical optimization. Fourth column: Accuracies measured on 25 different cases, each of which was designed by 12 different human designers (total 300 samples).

Figure 13:
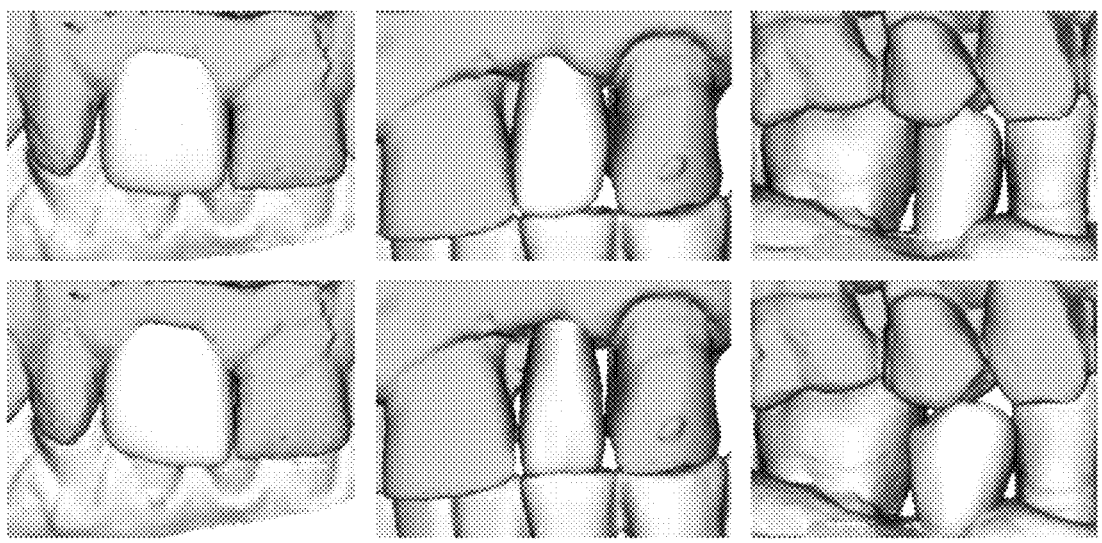
FIG. 13 shows in the upper row: crown designs created by human designers. Lower row shows crown designs predicted by our Machine Learning models in accordance with embodiments of the present invention.

FIG. 11 shows accuracy results with some selected abutment parameters with 0.5 mm and 1.0 mm range from the corresponding parameter values of human designs. FIG. 12 and FIG. 13 show some graphical results of the whole abutment or crown designs respectively created by the ML system according to embodiments of the present invention compared to the human designs.

FIG. 11 shows measuring accuracies of selected abutment shape parameters within 0.5 mm (first column) and 1.0 mm (second column) respectively. The result is based on ~70,000 training samples and ~7000 validation samples of upper left posterior (tooth #2, 3, 4, 5).

FIG. 12 shows in the upper row: Abutment designs created by human designers. Lower row shows abutment designs predicted by Machine Learning models in accordance with embodiments of the present invention.

FIG. 13 shows in the upper row: Crown designs created by human designers. Lower row shows crown designs predicted by Machine Learning models in accordance with embodiments of the present invention.

Design Validation

Figure 14:
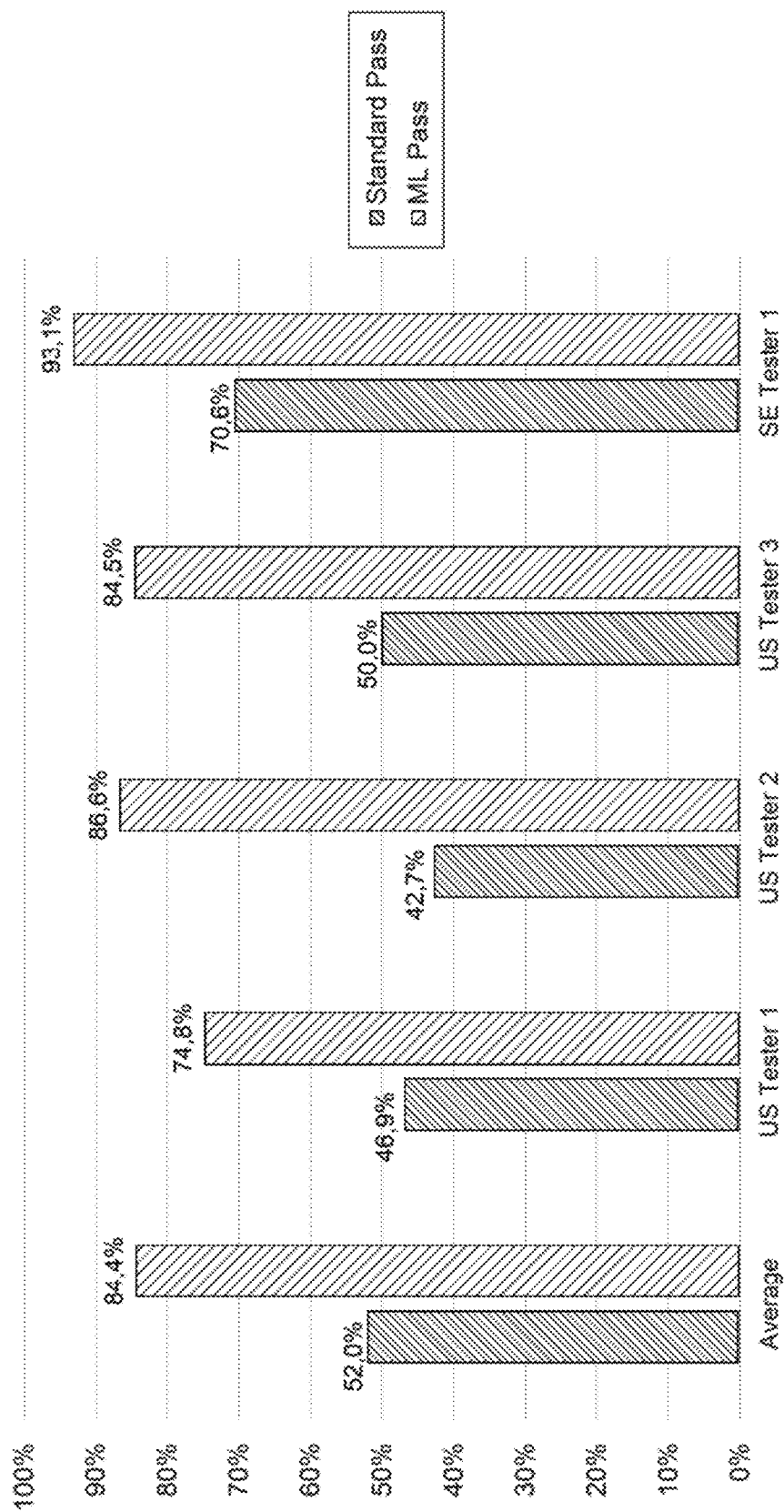

In addition to the comparison by the numerical accuracies on each design parameter, the perceptual design quality was compared with the participation of multiple expert human restoration designers. FIG. 14 shows acceptance rate comparison of the abutment designs between the ML-based method according to embodiments of the present invention and current optimization methods. Five different expert human designers examined 100 cases created by two different methods without the knowledge of the method by which each design was created. FIG. 14 shows far better acceptance rate of the abutment designs created by the ML system in accordance with embodiments of the present invention than the ones created by a current optimization system based on the blind testing on the same set of 100 cases.

Application to Automatic Tooth Number Estimation

In an earlier statement, we mentioned that the tooth number is one of the most important auxiliary input beside the 3D input scan and implant position and orientation. However, in a separate experiment, we have proven that this tooth number itself can be estimated pretty reliably using only the 3D input scan and implant position and orientation using the same problem formulation presented with this invention. The experimental result show that we can estimate the exact tooth number with about 91% accuracy and +/−1 tooth difference with 99% accuracy. This result indicates a possibility of a potential sub-system where we can first estimate the tooth number for the user automatically just based on the raw 3D input scan data before providing the full design estimation.

An Implementation

Methods according to the present invention can be performed by a processor or a processing means either as a standalone device or embedded in a subsystem or other device. The present invention can use a processing engine being adapted to carry out functions. The processing engine preferably has digital processing capability such as provided by one or more microprocessors, FPGA's, or a central processing unit (CPU) and/or a Graphics Processing Unit (GPU), and which is adapted to carry out the respective functions by being programmed with software, i.e. one or more computer programs. References to software can encompass any type of programs in any language executable directly or indirectly by a processor, either via a compiled or interpretative language. The implementation of any of the methods of the present invention can be performed by logic circuits, electronic hardware, processors or circuitry which can encompass any kind of logic or analog circuitry, integrated to any degree, and not limited to general purpose processors, digital signal processors, ASICs, FPGAs, discrete components or transistor logic gates and similar.

A processing means or processor may have memory (such as non-transitory computer readable medium, RAM and/or ROM), an operating system, optionally a display such as a fixed format display, ports for data entry devices such as a keyboard, a pointer device such as a "mouse", serial or parallel ports to communicate other devices, network cards and connections to connect to any network.

The software can be embodied in a computer program product adapted to carry out the functions of any of the methods of the present invention, e.g. as itemized below when the software is loaded into memory and executed on one or more processing engines such as microprocessors, ASIC's, FPGA's etc. Hence, a processing means or processor for use with any of the embodiments of the present invention can incorporate a computer system capable of running one or more computer applications in the form of computer software.

The methods described with respect to embodiments of the present invention above can be performed by one or more computer application programs running on the computer system by being loaded into a memory and run on or in association with an operating system such as Windows' supplied by Microsoft Corp, USA, Linux, Android or similar. The computer system can include a main memory, preferably random-access memory (RAM), and may also include a non-transitory hard disk drive and/or a removable non-transitory memory, and/or a non-transitory solid-state memory. Non-transitory removable memory can be an optical disk such as a compact disc (CD-ROM or DVD-ROM), a magnetic tape, which is read by and written to by a suitable reader. The removable non-transitory memory can be a computer readable medium having stored therein computer software and/or data. The non-volatile storage memory can be used to store persistent information that should not be lost if the computer system is powered down. The application programs may use and store information in the non-volatile memory.

The software embodied in the computer program product is adapted to carry out the following functions when the software is loaded onto the respective device or devices and executed on one or more processing engines such as microprocessors, ASIC's, FPGA's etc.:

Carrying out a computer-implemented method for training a machine learning system, the machine learning system being installed on one or more computing devices, Training the machine learning system with a plurality of preexisting treatment 3D data sets in an end-to-end manner, the 3D data sets comprising 3D images of patients' dentitions as inputs on one end of the machine learning system and 3D shapes of representations of patients' restorative dental objects on the other end as outputs.

inputting a representation of a 3D scan of at least one portion of a patient's dentition to a trained machine learning system (e.g. via an I/o port or an interface), the representation of a 3D' scan defining at least one implant position, the machine learning system being installed on one or more computing devices, and identifying, using the trained machine learning system, a representation of a 3D shape of the restorative dental object for the implant in an end to end manner.

The software embodied in the computer program product is adapted to carry out the following functions when the software is loaded onto the respective device or devices and executed on one or more processing engines such as microprocessors, ASIC's, FPGA's etc.:

training, by one or more computing devices and using a plurality of preexisting treatment 3D data sets, a machine learning system in an end-to-end manner, receiving, by the one or more computing devices, a patient's 3D scan data representing at least one portion of a patient's dentition which defines at least one implant position, and identifying, using the trained machine learning device, a representation of a 3D shape of the restorative dental object for the implant.

the identifying can be done in an end-to-end manner,

The software embodied in the computer program product is adapted to carry out the following functions when the software is loaded onto the respective device or devices and executed on one or more processing engines such as microprocessors, ASIC's, FPGA's etc.:
- applying computer based end-to-end Machine Learning model,
- optionally the machine learning system is a neural network,
- whereby the neural network can be a CNN,
- receiving comprises receiving scanned 3D images of the mouth of a patient or 3D images of the mouth of a patient retrieved from an archive.

The software embodied in the computer program product is adapted to carry out the following functions when the software is loaded onto the respective device or devices and executed on one or more processing engines such as microprocessors, ASIC's, FPGA's etc.:
- generating a 3D shape of the restorative dental object,
- The restorative dental object can be for direct for attachment to the implant or via one or more intermediaries.
  - whereby the 3D shape is not a free form 3D shape but is a parametric model that is defined by a set of parameters,
  - a first range of each parameter's value is divided among a set of bins of smaller second ranges, and the machine learning device is adapted to estimate the correct bin where a specific parameter belongs.
- Whereby a parameter can represent a characteristic of a tooth surface anatomy, a tooth dentition, or a restoration type.

The software embodied in the computer program product is adapted to carry out the following functions when the software is loaded onto the respective device or devices and executed on one or more processing engines such as microprocessors, ASIC's, FPGA's etc.:
- outputting from the trained machine learning system a representation of a shape expressed as a set of parameters which defines an abutment or crown,
- whereby the set of parameters is a part of a parametric modelling,
- adapting the machine learning system to use a discriminative ML algorithm,
- using a patient's dentition which comprises an upper and/or lower jaw, prepared and opposing jaws, missing tooth, implant, and tooth numbers.
- performing the method with the restorative dental object being a crown, or an abutment for an implant,
- extracting point samples on a 3D surface of jaw scan geometry adapted for input to an Artificial Neural Network (ANN) for each clinical case.

The software embodied in the computer program product is adapted to carry out the following functions when the software is loaded onto the respective device or devices and executed on one or more processing engines such as microprocessors, ASIC's, FPGA's etc.:
- training a parametric model using an ANN by mapping the input data to restoration dental object design parameters which are outputs of the ANN for all preexisting treatment 3D data sets in an end-to-end manner,
- saving the trained parametric model as a set of computer files in a network location, using classified parametric values in bins to determine parametric values for a new clinical case with input of 3D images.

The software embodied in the computer program product is adapted to carry out the following functions when the software is loaded onto the respective device or devices and executed on one or more processing engines such as microprocessors, ASIC's, FPGA's etc.:
- using a new clinical case of an implant-based restoration, the method comprising receiving input of a user design preference, patient jaw 3D scans, and an implant position and orientation from 3D scan data of a feature location object,
- extracting samples on the 3D surface of the jaw scan geometry in the same format as was used for training,
- sending the received input data to one or more computing device, which processes the request and returns a set of predicted design parameters using the trained ANN model,
- reconstructing dental restoration objects of the 3D model from predicted design parameters and rendering these to be presented to the user.

Any of the above software may be implemented as a computer program product which has been compiled for a processing engine in any of the servers or nodes of the network. The computer program product may be stored on a non-transitory signal storage medium such as an optical disk (CD-ROM or DVD-ROM), a digital magnetic tape, a magnetic disk, a solid-state memory such as a USB flash memory, a ROM, etc.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments. It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples but should be given the broadest interpretation consistent with the description as a whole.

While the invention has been described hereinabove with reference to specific embodiments, this was done to clarify and not to limit the invention. The skilled person will appreciate that various modifications and different combinations of disclosed features are possible without departing from the scope of the invention.

What is claimed is:

1. A computer-implemented method for providing a representation of a 3D shape of a restorative dental object for a patient, the method comprising:
   training, by one or more computing devices and using a plurality of preexisting treatment 3D data sets, a trained machine learning system in an end-to-end manner, wherein the plurality of preexisting treatment 3D data sets comprises 3D images of patients' dentitions and 3D shapes of representations of patients' restorative dental objects and the trained machine learning system includes a convolutional neural network, inputting a representation of a 3D scan of at least one portion of a patient's dentition to the trained machine learning system, the representation of a 3D scan defining at least one implant position of an implant, the trained machine learning system being installed on one or more computing devices, accessing a set of parameters used to generate a parametric model, each parameter of the set of parameters having a corresponding range, and each corresponding range having a set of bins having a limited resolution, wherein the set of parameters relate to a characteristic of a tooth surface anatomy, a tooth dentition, or a restoration type, estimating, by the convolutional neural network, a correct bin of the set of bins for each corresponding range of each parameter of the set of parameters, to obtain optimized parameters for a restorative dental object to correspond with the 3D scan of the at least one portion of the patient's dentition, and identifying, using the trained machine learning system and based on the optimized parameters of the parametric model, the representation of the 3D shape of the restorative dental object for the implant in an end-to-end manner.

2. A computer-implemented method according to claim 1, comprising applying computer based end-to-end machine learning models.

3. A computer-implemented method according to claim 1, wherein an output of the trained machine learning system is a representation of a 3D shape that is expressed as a set of parameters which defines an abutment or crown.

4. A computer-implemented method according to claim 3, wherein the set of parameters is a part of a parametric modelling.

5. A computer-implemented method according to claim 1 wherein the trained machine learning system is adapted to use a discriminative machine learning algorithm.

6. A computer-implemented method according to claim 1, wherein the restorative dental object is a crown, or an abutment for the implant.

7. A computer-implemented method according to claim 1, wherein point samples are extracted on a 3D surface of a jaw scan geometry adapted for input to the convolutional neural network.

8. A computer-implemented method according to claim 1, for a new clinical case of an implant-based restoration, the method comprising receiving input of a user design preference, patient jaw 3D scans, and an implant position and orientation from 3D scan data of a feature location object.

9. A computer-implemented method according to claim 1, further comprising manufacturing of a customized restorative element made from the representation of a 3D shape of the restorative dental object, the restorative dental object being a custom abutment or crown for an implant.

10. A computer-implemented system for providing a representation of a 3D shape of a restorative dental object for a patient, the system comprising:

means for training, by one or more computing devices and using a plurality of preexisting treatment 3D data sets, a trained machine learning system in an end-to-end manner, wherein the plurality of preexisting treatment 3D data sets comprises 3D images of patients' dentitions and 3D shapes of representations of patients' restorative dental objects and the trained machine learning system includes a convolutional neural network, means for inputting a representation of a 3D scan of at least one portion of a patient's dentition, a representation of a 3D scan defining at least one implant position of an implant, the inputting being to the trained machine learning system installed on one or more computing devices, means for accessing a set of parameters used to generate a parametric model, each parameter of the set of parameters having a corresponding range, and each corresponding range having a set of bins having a limited resolution, wherein the set of parameters relate to a characteristic of a tooth surface anatomy, a tooth dentition, or a restoration type, means for estimating, by the convolutional neural network, a correct bin of the set of bins for each corresponding range of each parameter of the set of parameters, to obtain optimized parameters for a restorative dental object to correspond with the 3D scan of the at least one portion of the patient's dentition, and means for identifying, using the trained machine learning system and based on the optimized parameters of the parametric model, the representation of the 3D shape of the restorative dental object for the implant in an end-to-end manner.

11. A computer-implemented system according to claim 10, comprising means for applying computer based end-to-end machine learning models.

12. A computer-implemented method for training a machine learning system, the machine learning system being installed on one or more computing devices, the method comprising:

training the machine learning system offline with a plurality of preexisting treatment 3D data sets in an end-to-end manner, the plurality of preexisting treatment 3D data sets comprising 3D images of patients' dentitions and 3D shapes of representations of patients' restorative dental objects, wherein the plurality of preexisting treatment 3D data sets comprises 3D images of patients' dentitions and 3D shapes of representations of patients' restorative dental objects and the machine learning system includes a convolutional neural network, the machine learning system used to generate a 3D shape of a restorative dental object, wherein the 3D shape was generated by a parametric model that is defined by a set of parameters, wherein a range of each parameter value of the set of parameters is divided among a set of bins each having a limited range thus providing a desired resolution, and the machine learning system, after training is adapted to estimate a correct bin where a specific parameter belongs to obtain optimized parameters for a restorative dental object, wherein a parameter of the set of parameters relates to a characteristic of a tooth surface anatomy.

13. A computer-implemented system for training a machine learning system, the machine learning system being installed on one or more computing devices, the computer-implemented system comprising:

means for training the machine learning system offline with a plurality of preexisting treatment 3D data sets in an end-to-end manner, the plurality of preexisting treatment 3D data sets comprising 3D images of patients' dentitions as inputs to the machine learning system and 3D shapes of representations of patients' restorative dental objects as outputs of the machine learning system, wherein the plurality of preexisting treatment 3D data sets comprises 3D images of patients' dentitions and 3D shapes of representations of patients' restorative dental objects and the machine learning system includes a convolutional neural network, the machine learning system used to generate a 3D shape of a restorative dental object, wherein the 3D shape was generated by a parametric model that is defined by a set of parameters, wherein a range of each parameter value of the set of parameters is divided among a set of bins each having a limited range thus providing a desired resolution, and the machine learning system, after training, is adapted to estimate a correct bin where a specific parameter belongs to obtain optimized parameters for a restorative dental object, wherein a parameter of the set of parameters relates to a characteristic of a tooth surface anatomy.

* * * * *